(12) United States Patent
Beraud et al.

(10) Patent No.: US 10,059,063 B2
(45) Date of Patent: Aug. 28, 2018

(54) FIBROUS PREFORMS FOR USE IN MAKING COMPOSITE PARTS

(71) Applicant: Hexcel Reinforcements, Dagneux (FR)

(72) Inventors: Jean-Marc Beraud, Rives (FR); Jean-Florent Lamethe, Chambery (FR); Jean-Christophe Minni, Le Grand Bornand (FR)

(73) Assignee: Hexcel Reinforcements, Dagneux (FR)

( * ) Notice: Subject to any disclaimer, the term of this patent is extended or adjusted under 35 U.S.C. 154(b) by 245 days.

(21) Appl. No.: 15/199,474

(22) Filed: Jun. 30, 2016

(65) Prior Publication Data

US 2016/0311175 A1    Oct. 27, 2016

Related U.S. Application Data

(62) Division of application No. 13/125,058, filed as application No. PCT/FR2009/052039 on Oct. 23, 2009, now Pat. No. 9,427,917.

(30) Foreign Application Priority Data

Oct. 23, 2008  (FR) ...................................... 08 57214
Feb. 6, 2009   (FR) ...................................... 09 50759

(51) Int. Cl.
   B29C 70/08    (2006.01)
   B29B 11/12    (2006.01)
   (Continued)

(52) U.S. Cl.
   CPC ............ B29C 70/083 (2013.01); B29B 11/12 (2013.01); B29B 11/16 (2013.01); B29C 70/226 (2013.01);
   (Continued)

(58) Field of Classification Search
   CPC ... B29C 70/083; B29C 70/443; B29C 70/226; B29C 70/545; B29B 11/12; B29B 11/16;
   (Continued)

(56) References Cited

U.S. PATENT DOCUMENTS 6,503,856 B1   1/2003   Broadway et al.
6,828,016 B2   12/2004  Mitani et al.
(Continued)

FOREIGN PATENT DOCUMENTS

EP   1125728 A   8/2001
EP   1473132 A   11/2004
(Continued)

OTHER PUBLICATIONS

T700s Data Sheet; http://www.toraycfa.com/pdfs/T700SDataSheet.pdf; accessed: May 15, 2014.
(Continued)

*Primary Examiner* — Nancy R Johnson
(74) *Attorney, Agent, or Firm* — W. Mark Bielawski; David J. Oldenkamp

(57) ABSTRACT

The present invention concerns preforms made with a new intermediate material composed of a unidirectional layer of carbon fibers with a weight of 100 to 280 g/m$^2$, associated on each of its faces, with a web of thermoplastic fibers having a thickness of 0.5 to 50 microns, preferably 3 to 35 microns, the intermediate material having a total thickness of 80 to 380 microns, preferably from 90 to 320 microns, and a process for manufacturing composite parts from such preforms and the resulting composite parts.

20 Claims, 10 Drawing Sheets

(51) Int. Cl.

| | |
|---|---|
| *B29B 11/16* | (2006.01) |
| *B29C 70/22* | (2006.01) |
| *B29C 70/44* | (2006.01) |
| *B32B 5/02* | (2006.01) |
| *B32B 5/26* | (2006.01) |
| *B29C 70/54* | (2006.01) |
| *B32B 5/22* | (2006.01) |
| *B29K 63/00* | (2006.01) |
| *B29K 105/08* | (2006.01) |
| *B29K 277/00* | (2006.01) |
| *B29K 307/04* | (2006.01) |
| *B29L 31/30* | (2006.01) |

(52) U.S. Cl.
CPC .......... *B29C 70/443* (2013.01); *B29C 70/545* (2013.01); *B29C 70/547* (2013.01); *B32B 5/02* (2013.01); *B32B 5/022* (2013.01); *B32B 5/22* (2013.01); *B32B 5/26* (2013.01); *B29K 2063/00* (2013.01); *B29K 2105/0881* (2013.01); *B29K 2277/00* (2013.01); *B29K 2307/04* (2013.01); *B29K 2995/0063* (2013.01); *B29K 2995/0089* (2013.01); *B29K 2995/0097* (2013.01); *B29L 2031/3076* (2013.01); *B32B 2260/021* (2013.01); *B32B 2260/04* (2013.01); *B32B 2260/046* (2013.01); *B32B 2262/02* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2262/106* (2013.01); *B32B 2307/50* (2013.01); *B32B 2307/558* (2013.01); *B32B 2307/718* (2013.01); *B32B 2605/00* (2013.01); *B32B 2605/18* (2013.01); *Y10T 428/24975* (2015.01)

(58) Field of Classification Search
CPC .. B32B 5/022; B32B 5/02; B32B 5/22; B32B 5/26; B32B 2262/0292; B32B 2262/0261; B32B 2262/0246; B32B 2262/02; B32B 2260/046; B32B 2260/21; B32B 2262/0276; B32B 2262/0253; B32B 2605/18; B32B 2307/50; B32B 2307/558; B32B 2307/718; B32B 2605/00; B32B 2262/106; B29K 2307/04; B29K 2995/0063; B29K 2995/0089; B29K 2277/00; B29K 2063/00; B29K 2105/0881; B29K 2995/0097; B29L 2031/3076; Y10T 428/24975
See application file for complete search history.

(56) References Cited

U.S. PATENT DOCUMENTS

| | | |
|---|---|---|
| 2003/0008125 A1 | 1/2003 | Delanoy |
| 2004/0137208 A1 | 7/2004 | Mani et al. |
| 2004/0219855 A1 | 11/2004 | Tsotsis |
| 2006/0154545 A1 | 7/2006 | Tsotsis |
| 2007/0149080 A1 | 6/2007 | Asahara et al. |
| 2009/0291278 A1 | 11/2009 | Kawabe et al. |

FOREIGN PATENT DOCUMENTS

| | | |
|---|---|---|
| EP | 1731282 A | 12/2006 |
| GB | 2237583 A | 5/1991 |
| WO | 2006121961 | 11/2006 |
| WO | 2007015706 | 2/2007 |
| WO | 2008/020628 A1 | 2/2008 |

OTHER PUBLICATIONS

"Elvamide, nylon multipolymer resin." Adhesives Guide by DuPont. Rev. Aug. 1995. https://web.archive.org/web/20060516084744/http://plastics.dupont.com/plastics/pdflit/americas/elvamide/H85929.pdf. Published on web May 16, 2006. accessed Oct. 30, 2014.

FIBROUS PREFORMS FOR USE IN MAKING COMPOSITE PARTS

This application is a divisional of U.S. Ser. No. 13/125,058, filed on Jun. 10, 2011, which is a 371 of PCT/FR09/52039, tiled on Oct. 23, 2009.

BACKGROUND OF THE INVENTION

1. Field of the Invention

The invention concerns the technical field of reinforcement, materials adapted to the creation of composite parts. More specifically, the invention concerns a new intermediate material containing a unidirectional layer for fabricating composite parts, by subsequent injection or infusion of thermosetting resin, a fabrication process for composite parts from a stack of such a material, as well as the obtained composite parts.

2. Description of Related Art

The manufacture of composite parts or goods, that is, comprising, on one hand, one or more reinforcements or fibrous layers, and on the other hand, a primarily thermosetting ("resin") matrix and that can include thermoplastics, can for instance, be achieved by a process called "direct" or "LCM" (from the English "Liquid Composite Moulding"). A direct process is defined by the fact that one or more fibrous reinforcements are implemented in a "dry" state (that is, without the final matrix), the resin or matrix being implemented separately, for instance by injection into the mold containing the fibrous reinforcements ("RTM" process, from the English Resin Transfer Moulding), by infusion through the thickness of the fibrous reinforcements ("LRI" process, from the English "Liquid Resin Infusion or "RFI" process, from the English "Resin Film Infusion"), or alternatively by manual coating/impregnation by roller or brush on each unit layer of fibrous reinforcement, applied successively on the mold.

For the RTM, LRI or RFI processes, it is generally first necessary to build a fibrous preform of the mold of the desired finished product, then to impregnate this preform with a resin. The resin is injected or infused by differential pressure at temperature, then once all the amount of necessary resin is contained in the preform, the assembly is brought to a higher temperature to complete the polymerization/reticulation cycle and thus harden it.

The composite parts used in the automobile, aviation, or naval industry, are particularly subject to very strict requirements, notably in terms of their mechanical properties. Indeed, the mechanical properties of the parts are mainly related to a parameter which is the fiber volume ratio (VFR).

In these sectors, a large number of preforms are fabricated based on a reinforcement material, primarily carbon fibers, notably of the unidirectional type. It is possible to theoretically calculate the maximum fiber volume ratio contained in a unidirectional layer by assuming two types of structure: hexagonal or square. Assuming respectively a hexagonal-type structure and a square-type structure, the maximum VFR obtained is respectively 90.7% and 78.5% (An Introduction to Composite Materials, D. Hull, T. W. Clyne, Second Edition, Cambridge Solid State Science Series, 1996). In reality however, it appears difficult to obtain fiber volume fractions greater than 70% for composite parts. In practice, it is commonly accepted by the person skilled in the art, that a fiber volume ratio (VFR) of about 60% is standard for implementing satisfactory composite parts, along with good reproducibility (S. T. Peters, "Introduction, composite basics and road map", in Handbook of Composites, Chapman & Hall, 1998, p. 1-20 and particularly p. 8), The resin that is subsequently associated, notably by injection or infusion, to the unidirectional reinforcement layers during the creation of the part, can be a thermosetting resin, of the epoxy type for instance. In order to allow a correct flow through a preform composed of a stack of different layers of carbon fibers, this resin is most often very fluid. The major drawback of this type of resin is its fragility after polymerizational reticulation, which results in poor impact resistance of the fabricated composite parts.

In order to solve this problem, the prior art documents proposed the association of the unidirectional layers of carbon fibers with a web of thermoplastic fibers. Solutions such as these are notably described in the patent applications or patents EP 1125728, U.S. Pat. No. 628,016, WO 2007/015706, WO 2006/121961 and U.S. Pat. No. 6,503,856. The addition of this web makes it possible to improve mechanical properties in the compression after impact (CAI) test commonly used to characterize the impact resistance of the structures.

Document US 2006/0154545 describes such a solution in the case of a unidirectional fabric but which given the characteristics of the material described, does not make it possible to obtain a satisfactory VFR.

Some details on these prior solutions for unidirectionals are provided below. Patent application EP 1125728 in the name of Toray Industries Inc. describes a reinforcement material that associates a layer of reinforcement fibers to a short-fiber nonwoven material. The nonwoven is laminated on at least one face of the reinforcement layer, so that the fibers composing the nonwoven pass through the reinforcement fibers (of carbon) of the layer and are thus integrated into the reinforcement fibers. The nonwoven consists of a mix of low-melting point fibers and high-melting point fibers. It is important to note that all the cited examples use a single nonwoven material associated on only one face of the layer of reinforcement fibers consisting of a fabric or of a unidirectional layer, leading to a non-symmetrical reinforcement material. Example 4 uses a layer of reinforcement fibers consisting of a unidirectional fabric of 300 g/m$^2$. The thickness of the nonwoven being used is not indicated, but it is certainly rather high, given its surface density (8 g/m$^2$) and its indicated 90% void ratio. The stack used is of the type $[-45/0/+45/90]_{2s}$, that is, 7 interplies containing a single nonwoven material. If the instructions in this document are applied to a layer of carbon fibers with a lesser surface density, 134 g/m$^2$ for instance, the association with a same type of web, but on each side to obtain a symmetric material, would lead to a very low fiber volume ratio, non-compatible with the creation of primary structures for the aeronautic industry.

Patent application WO 2007/015706 in the name of The Boeing Company describes a method for the fabrication of preforms combining a stitched assembly that alternates layers of carbon fibers and layers of nonwoven materials to increase the impact resistance of composite structures. The nonwovens are placed at each interply and not on each side of the carbon fiber layers. This patent application does not mention any range of surface density for the carbon layers, nor a range of thicknesses for the nonwoven materials. The examples mention the use of three different nonwovens for which only the surface densities of 4.25 g/m$^2$ (0.125 oz/yd$^2$ in American units), 8.5 g/m$^2$ (0.25 oz/yd$^2$), and 12.7 g/m$^2$ (0.375 oz/yd$^2$) are specified. No indication is provided for the thickness of these products. One of the webs based on a copolyester actually has a negative effect on the impact resistance properties. The examples indicate the thickness of the created panels, the surface density of the carbon layers (190 g/m$^2$) and the type of carbon fibers T700 with a volume density of 1780 kg/m$^3$). The thicknesses vary from 0.177 to 0.187 inch (4.5 to 4.75 mm) for the panels with the best rupture stress results in compression after impact (CAI). From these thicknesses and the information about the type of fibers and the surface density of the carbon plies, it is possible to evaluate the VFR of the panels, which varies between 54 and 57%, lower than the value generally considered by the person skilled in the art for the fabrication of primary parts. The best CAI result (39.6 ksi or 273 MPa) is obtained for a VFR of 54%.

In patent application WO 2006/121961, a nonwoven material consisting of soluble fibers (of epoxy resins for instance) is intercalated at each interply of carbon fiber layers during the creation of the preform. The nonwoven is not directly associated with the carbon layer. The presented example uses a carbon fiber fabric with a surface density of 370 g/m$^2$ with a nonwoven material of 60 g/m$^2$. The fabricated plate makes it possible to obtain a VFR of only 55%. At the same time, the lack of precision about the compression alter impact CAI) test (no specification of the impact energy) does not make it possible to deduce the mechanical performances of the indicated measured value.

U.S. Pat. No. 6,503,856 mentions the use of a carbon layer on which two adhesive layers in the form of webs are superimposed on at least one side of the carbon layer. This patent does not indicate the thicknesses of the adhesive layers (only the diameters of the fibers of the two layers) and the preferred surface density of the carbon ranges from 200 to 1000 g/m$^2$. Sources of electricity (batteries, fuel cells) are the target application for this type of product, and the relevance of such a product is not highlighted.

Consequently, it appears that the addition of a web to the techniques of previous art is carried out most often to the detriment of other mechanical properties. Indeed, as mentioned earlier, the mechanical properties are primarily determined by the volume fiber ratio (VFR) and the techniques described in previous art do not notably make it possible to obtain composite parts that have a VFR of the order of 60%.

SUMMARY OF THE INVENTION

Thus, one of the objectives of the invention is to propose a new intermediate product, adapted to the fabrication of composite parts based on thermosetting resins, and notably by resin injection or infusion, that makes it possible to obtain composite parts with a volume fiber ratio of the order of 60% and with satisfactory mechanical properties, to meet certain very strict specifications, imposed for instance in the field of aviation.

Another objective of the invention, is to fulfill these specifications, while proposing a symmetrical intermediate product that would be easier to implement and more adapted to automated processes.

In this context, the invention concerns a new intermediate material for the production of composite parts, by subsequent injection or infusion of a thermosetting resin, consisting of a unidirectional layer of carbon fibers with a surface density of 100 to 280 g/m$^2$, associated on each of its faces with a web of thermoplastic fibers with a thickness of 0.5 to 50 microns, the intermediate product according to the invention having a total thickness in the range of 80 to 380 microns, preferably in the range of 90 to 320 microns.

The invention also concerns a method of fabricating such an intermediate material in which a unidirectional layer of carbon fibers with a surface density of 100 to 280 g/m$^2$, is associated on each of its faces with a web of thermoplastic fibers, said webs each having a thickness of 0.5 to 50 microns, preferably 3 to 35 microns, through a stage of melting/cooling of the webs, such that the intermediate material presents a total thickness of 80 to 380 microns, preferably 90 to 320 microns.

In another one of its aspects, the invention concerns a stack of intermediate materials according to the invention, joined together within the stack. According to a preferred embodiment, such a stack is not secured by stitching or knitting, but by a weld performed through an operation of heating/cooling of the web.

Another object of the invention is a fabrication process for a composite part consisting of the following steps:

a) create a stack of intermediate materials according to the invention, b) subsequently consolidate the stack in the form of a preform, c) add a thermosetting resin by infusion of injection, d) consolidate the desired part by a stage of thermal treatment under pressure, followed by cooling such that the obtained composite parts notably have a fiber volume ratio (VFR) of 57 to 63%, preferably of 59 to 61%. In one particular embodiment of the process according to the invention, the thermosetting resin is added by infusion at a pressure lower than atmospheric pressure, notably at a pressure lower than 1 bar, for example, between 0.1 and 1 bar.

The intermediate material and the process according to the invention make it possible to create composite parts with a VFR of the order of 60%, which corresponds to the standard factor for primary structures in aviation (that is, the vital parts of the aircraft) and also to significantly improve the low-speed impact resistance of the obtained composite parts: for instance, the fall of a tool in a workshop during the fabrication of a composite structure, a collision with a foreign body during its use.

The pressure applied during an injection process is higher than that used during an infusion process. The result is that it is easier to fabricate parts with a correct VFR, using an injection rather than an infusion process. The materials according to the invention make it possible to reach a desired volume fiber ratio, notably of the order of 60%, even when the composite part is fabricated with a stage c) which uses an infusion rather than an injection of resin. Such an embodiment is also an advantageous variant.

The composite parts that can be obtained according to the invention process are also integral parts of the invention, particularly the parts with a volume fiber ratio of 57 to 63% and notably of 59 to 61%.

The following description, with reference to the appended figures, makes it possible to better understand the invention.

DETAILED DESCRIPTION OF THE INVENTION

Figure 1:
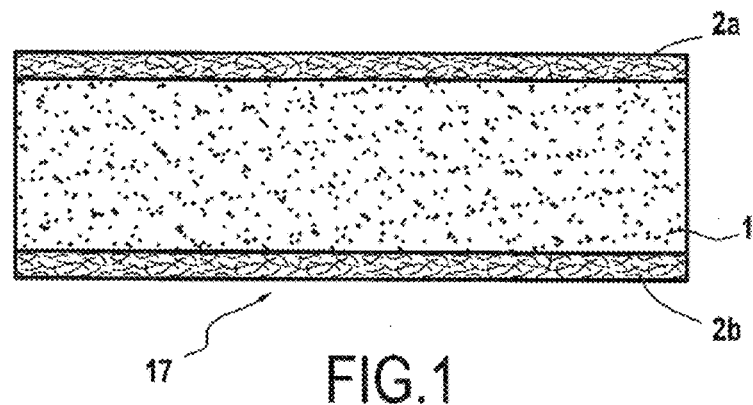
FIG. 1 is a cross-section of an intermediate material according to the invention.

A "unidirectional layer of carbon fibers" means a layer composed exclusively or quasi-exclusively of carbon fibers placed parallel to one another. It is possible to include the presence of thermoplastic bonding strands, notably, polyamides, copolyamides, polyesters, copolyesters, ester/ether block copolyamides, polyacetals, polyolefins, thermoplastic polyurethanes, phenoxy, to facilitate the manipulation, if need be, of the layer before its association with the thermoplastic fiber webs. These bonding strands will most often lie transversally to the carbon fibers. The term "unidirectional layer" also includes the unidirectional fabrics in which spaced weft strands cross, by interlacing, the carbon fibers that lie parallel to one another and constitute the warp strands of the unidirectional fabric. Even in these different cases, where such bonding, stitching or weft strands are present, the carbon fibers parallel to one another will represent at least 95% of the weight of the layer, which is therefore qualified as "unidirectional". However, according to a particular embodiment of the invention, the unidirectional layer contains no weft fiber to interlace with carbon fibers, so as to avoid any undulation. In particular, the intermediate material according to the invention contains neither weaving, nor stitching, nor knitting. In the unidirectional layer, carbon strands are preferably, not associated with a polymeric binder and are therefore qualified as dry, meaning that they are neither impregnated, nor coated, nor associated with any polymeric binder before their association with the thermoplastic webs. Carbon fibers are, however, most often characterized by a high weight ratio of standard sizing that can represent at most 2% of their weight.

As part of the invention, the layer of carbon fibers that constitutes the core of the intermediate material has grammage of 100 to 280 g/m$^2$. This range of grammage makes it easy for design engineers to correctly dimension composite structures by adapting the stacking sequences of different layers, as a function of the different modes of mechanical stress of the composite structures. A lower carbon grammage of an elementary layer will offer that much more versatility in the choice of different possible stacks with constant thickness.

The grammage of the unidirectional layer within the intermediate material matches that of the unidirectional layer before its association with the webs, but it is not possible to measure the grammage of the unidirectional layer before its association with the webs because the strands have no cohesion with each other. The grammage of the carbon fiber layer can be determined from the grammage of the intermediate material (unidirectional layer+2 webs). If the surface density of the webs is known, it is then possible to deduce the surface density of the unidirectional layer. The surface density is usefully determined from the intermediate product by chemical etching (possibly also by pyrolysis) of the web. This type of method is conventionally used by the person skilled in the art to determine the ratio of carbon fibers of a fabric or of a composite structure.

What follows describes a method for measuring the grammage of the intermediate material. The grammage of the intermediate material is measured by weighing cut samples of 100 cm$^2$ (that is, 113 mm in diameter). To facilitate the cutting of the flexible intermediate material samples, the intermediate material is placed between two glossy cards from the company Cartonnage Roset (Saint Julien en Genevois, France) of 447 g/m$^2$ and a thickness of 0.450 mm to assure a certain rigidity for the assembly. A pneumatic circular punch from the company Novi Profibre (Eybens, France) is used to cut out the assembly 10 samples are collected for each type of fabricated intermediate product.

In the unidirectional layer, the carbon fibers are most often found in the form of strands of at least 1000 filaments and notably 3000 to 50,000 filaments, for instance 3K, 6K, 12K or 24K. The carbon fibers have a count between 60 and 3800 tex, and preferentially between 400 and 900 tex. The thickness of the unidirectional carbon layer varies between 90 and 270 μm.

The unidirectional layer is associated on each of its faces with a web of thermoplastic fibers, leading to an intermediate product such as shown in FIG. 1. The use of a symmetric intermediate product makes it possible to avoid any stacking error during its manual or automatic placement for the creation of composite parts, and therefore to limit the generation of fragile zones, notably of an interply without web.

"Web" means a nonwoven material of continuous or short fibers. In particular, the fibers composing the nonwoven will have diameters in the range of 0.5 et 70 μm. In the case of a short fiber nonwoven material, the fibers will have a length of 1 to 100 mm.

As part of the invention, the fibers constituting the web are advantageously made of a thermoplastic material, especially selected from: polyamides (PA: PA6, PA12, PA11, PA6,6, PA 6,10, PA 6,12, . . . ), copolyamides (CoPA), the polyamides—block ether or ester (PEBAX, PEBA) polyphthalamide (PPA), polyesters (polyethylene terephthalate—PET-, polybutylene terephthalate—PBT- . . . ), copolyesters (CoPE), thermoplastic polyurethanes (TPU), polyacetals (POM . . . ), polyolefins (PP, HDPE, LDPE, LLDPE . . . ), polyethersulfones (PES), polysulfones (PSU . . . ), polyphenylene sulfones (PPSU . . . ) polyetheretherketone (PEEK), polyetherketoneketone (PEKK), poly (phenylene sulfide) (PPS), or Polyetherimides (PEI), thermoplastics polyimides, liquid crystal polymers (LCP), phenoxys, block copolymers such as styrene-butadiene-methylmethacrylate (SBM), methylmethamdate-butyl acrylate-methylmethacrylate copolymers (MAM) or a mixture of fibers consisting of these thermoplastic materials. The material is of course adapted to the different, types of thermosetting systems used to create the matrix during the subsequent fabrication of composite parts.

The thickness of the webs before their association with the unidirectional layer will be selected depending on the manner in which they will be associated with the layer of carbon fibers. Most often, their thickness will be very close to the thickness desired for the intermediate product. It can also be possible to select the use of a thicker web which will be laminated under temperature during the association stage so as to reach the desired thickness. In a preferred manner, the carbon layer is associated on each of its large faces with two essentially identical webs so as to obtain a perfectly symmetrical intermediate product. The thickness of the web before association with the carbon unidirectional layer varies between 0.5 and 200 µm, and preferably between 10 and 170 µm. On the intermediate product according to the invention, the thickness of each web is in the range of 0.5 to 50 microns, and preferably in the range of 3 to 35 microns.

The thickness of the different webs before association is determined by the standard NF EN ISO 9073-2, using method A with a test area of 2827 mm$^2$ (60 mm diameter disc) and an applied pressure of 0.5 kPa.

The intermediate product of the invention has a thickness in the range of 80 to 380 microns, preferably in the range of 90 to 320 microns, which notably makes it possible to achieve the desired fiber volume ratio on the produced final part, even if the latter is fabricated by infusion under reduced pressure.

The standard NF EN ISO 9073-2 does not allow the measurement of one of the components of a material combined from several components. Two methods have thus been implemented: one to measure the thickness of the web once it is laminated on the unidirectional layer, and the other to measure the thickness of the intermediate product.

Accordingly, the thickness of the nonwoven material or web attached to the unidirectional carbon layer has been determined from microscopic cross-sections that allow a precision of +/−1 µm. The method is as follows: An intermediate material associating a unidirectional layer composed of carbon strands with two webs laminated on each side of the layer is impregnated using a brush, with a resin which polymerizes at ambient temperature (Araldite and Araldur 5052 from the company Huntsman). The assembly is placed between two plates to apply a pressure of the order of 2-5 kPa during the polymerization. The thickness measurement of the web present in the intermediate product is independent of the pressure exerted during this step. A slice of the assembly is encased in a cold-casting resin Epofix Kit from Struers, then polished (with a 320 µm silicon carbide abrasive paper and different felts down to 0.3 µm) for viewing with an Olympus BX 60 optical microscope combined with an Olympus ColorView IIIu camera. The implementation of this resin which polymerizes at ambient temperature has no influence on the thickness of the web, but solely makes it possible to perform the measurements. The software program analySIS auto 5.0 from the company Olympus Soft Imaging Solution GmbH makes it possible to take photographs and obtain the thickness measurements. For each intermediate material (unidirectional layer combined with webs on each side). 5 images are taken at an enlargement of 20. On each image, 15 thickness measurements are taken of the web and their average and standard deviation are determined.

Figure 3A:
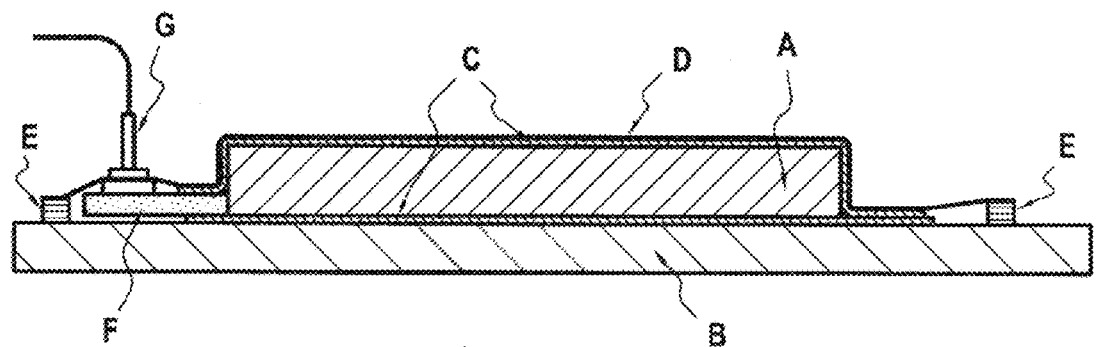
FIGS. 3A and 3B represent a device for measuring the thickness of a preform under vacuum.
Figure 3B:
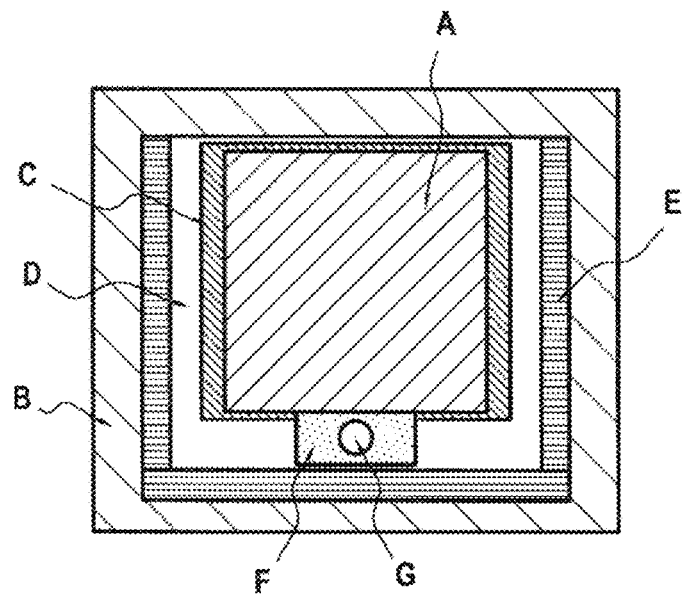

The thickness of the intermediate product was determined with the following method, whose device is shown in FIGS. 3a and 3b, which determines an average for a stack of intermediate products. In these figures N designates the preform; B the support plate; C the silicon paper; D the vacuum bagging film; E the vacuum fitting; F the draining felt, and G the vacuum port. This method is conventionally used by the person skilled in the art and enables a global measurement while minimizing the variability that can exist locally within a given intermediate product. A preform composed of a stack of different oriented layers of the intermediate product is placed between two layers of 130 g/m$^2$ silicon paper with a thickness of 0.15 mm, sold by the company SOPAL, in vacuum bagging film CAPRAN 518 from Elie company Aerovac (Aerovac Systémes France, Umeco Composites, 1 rue de la Sausse 31240 Saint-Jean, France) and in contact with a drainage felt Airbleed 10HA sold by Aerovac. The leak-tightness of the assembly is assured by a vacuum fitting SM5130 sold by Aerovac. A vacuum of 0.1 to 0.2 kPa is, pulled with a Leybold SV40 B vacuum pump (Leybold Vacuum, Bourg les Valence, France). The thickness of the preform is next measured between two TESA Digico 10 digital comparators after subtracting the thickness of the vacuum bag and of the silicon papers. 25 measurements are taken on each preform and their average and standard deviation are determined. The thickness of the intermediate product is then determined by dividing the total thickness of the preform by the number of layers of superimposed intermediate products.

The thickness of the intermediate product usefully presents little variability, notably with thickness variations not exceeding standard deviations of 20 µm, preferably not exceeding 10 µm, as illustrated notably in the examples below.

Additionally, the surface density of the web is usefully in the range of 0.2 to 20 g/m$^2$.

The association between the unidirectional layer and the webs can be obtained in discontinuous batches, for example only at certain points or areas, but is preferably performed using a bond described as continuous, which extends over the entire surface of the layer. The association of the unidirectional layer with the two webs can be obtained by means of an adhesive layer, selected for instance among epoxy adhesives, polyurethane adhesives, thermosetting glues, adhesives based on polymerizable monomers, structural acrylic, or modified acrylic adhesives, and hot-melt adhesives. But most often, the association is enabled by the tacky nature of the hot webs, for example during a thermocompression step which assures a bond between the unidirectional layer and the webs. This stage causes a softening of the thermoplastic fibers of the web, allowing the unidirectional layer to consolidate with the webs after cooling. The heating and pressure conditions will be adapted to the material constituting the webs and to their thickness. Most often, a thermocompression stage over the entire surface of the unidirectional layer will be created at a temperature in the range of $T_{fweb}-15°$ C. and $T_{fweb}+60°$ C. (with $T_{fweb}$ designating the fusion temperature of the web) and under a pressure of 0.1 to 0.6 MPa. It is thus possible to achieve compression ratios of 1 to 10 before and after association with the web. The lamination stage of the web onto the unidirectional carbon material is equally decisive to correctly determine the final thickness of the intermediate product. Indeed, depending on the temperature and pressure conditions, notably during the lamination, it is possible to modify and therefore to adjust the thickness of the web on each side of the intermediate product. It is also conceivable to associate the unidirectional layer to the web(s) only at some areas by localized heating of the web, so as to obtain a bond that could be likened to a stitching or knitting spot bond used in prior art to produce multiaxial materials and to bind unidirectional layers to each other. Heating can be obtained by conventional resistance heating or by ultrasonic means. Spot welds leading to a global discontinuous weld can be considered. The term "spot" is used as part of the description to designate individual welds belonging to a set of welds and therefore includes different forms of welds. In the plane of the intermediate material, spot welds may notably appear in the form of discontinuous or continuous lines, that is, extending over the full width of the unidirectional layer, of spots of various forms, notably circular or prismatic, of rings . . . . Adapted means of heating, acting as a punch, are used to perform such spot welds. These spot welds leading to a global discontinuous weld enable a better drapabilty, for instance. These spot welds are distributed over the surface of the intermediate material to assure its cohesion and make it possible to assure a bond between the unidirectional layer and the webs. In order to assure the bonding of all the fibers of the unidirectional layer, the welds may extend in continuous lines across over the entire width of the intermediate material, for example transversally to the unidirectional layer. It is also possible to implement discontinuous lines or spot welds offset with respect to each other, such that each strand systematically encounters a weld, for instance at least one weld every 100 mm, preferably at least one weld ever 10 mm.

The unidirectional layer can be created directly, on line, before its association with the thermoplastic webs. In this case, the strands needed to create the layer are then unwound from coils and placed on a conveyor belt so as to extend parallel to each other, and joined together. A process, such as described in patent EP 0972102 may also be implemented. It is also possible to use a commercial unidirectional layer whose cohesion and handling will, for instance, be assured by bonding strands, with a mechanical bond by weaving, or with a chemical bond using the polymer nature of the bonding strands. In all cases, the unidirectional layer that will be secured to the web(s) will provide total coverage with an openness factor of 0%. For instance, these layers are sold by SIGMATEX UK Limited, Runcorn Cheshire WA7 1TE, United Kingdom as item PW-BUD (for instance, product #PC2780600 200GSM/PW-BUD/T700SC 12K 50C/0600mm), or by the company ODEON AB. Sweden, as item TEXERO. Once the bond between the webs and the unidirectional layer is fabricated, the intermediate material thus obtained generally has an openness factor of 0%. The openness factor is determined, for instance, by the method described in the examples below.

Thereafter, once the unidirectional layer is associated with the unidirectional layer(s) web(s), it is possible to change its openness factor, and thus increase its permeability by creating holes or perforations. In such eases, it may be interesting to produce an openness factor of 0.1 to 5%, preferably between 1 and 2%, obtained with perforations through the thickness of the intermediate material, for example transversally to it. Because the intermediate material of the invention is not woven or stitched, it has a controlled fine thickness which allows an openness factor of about 1% to 2%, while offering the possibility of a laminate with a VFR of 59 to 61%, notably on the order of 60% for vacuum infusion.

Figure 4A:
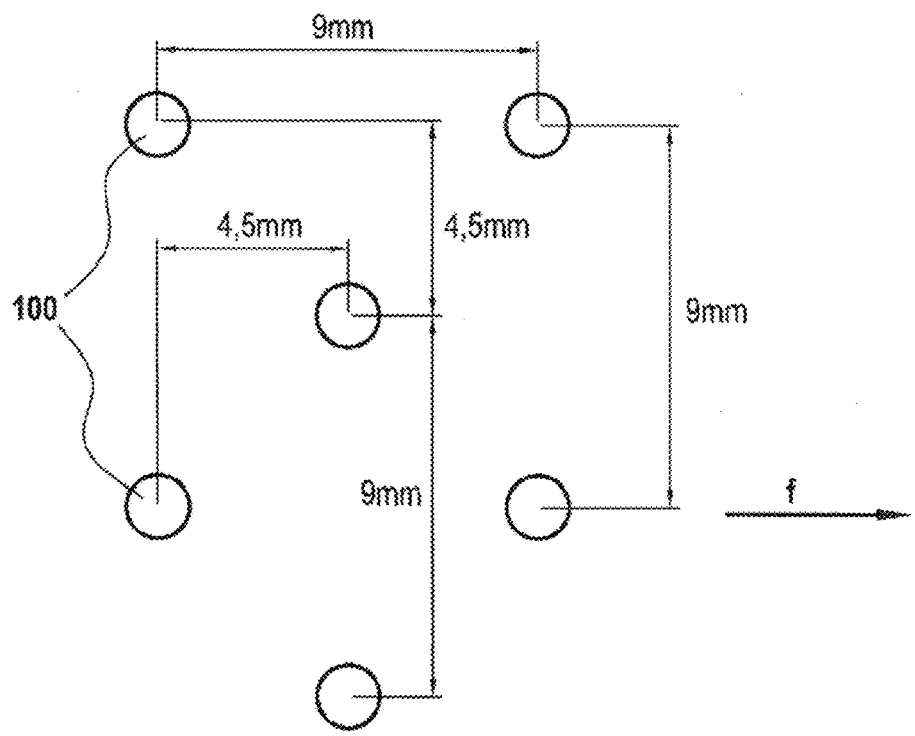
FIGS. 4A and 4B are schematic top views of an intermediate material according to the invention, in which perforations were performed.
Figure 4B:
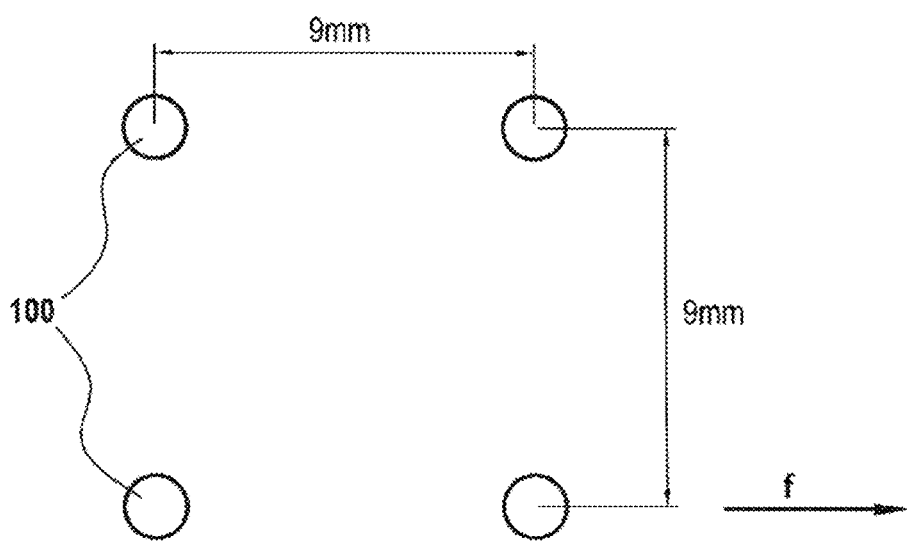
Figure 15:
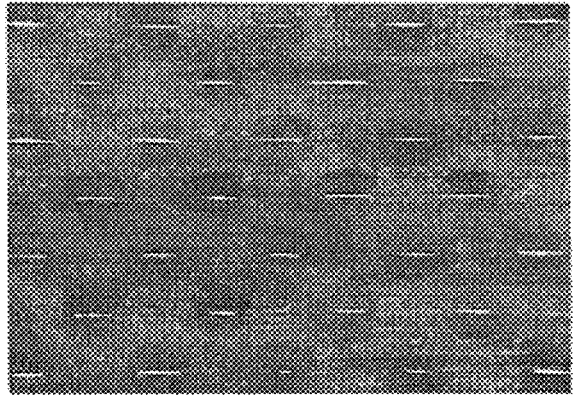
FIG. 15 is a photograph from above of an intermediate product perforated according to the invention.

For example, the perforations are systematic and are preferably located along straight lines extending in one or two directions, notably at intervals of 4 to 15 mm. FIGS. 4A and 4B are schematics of the positioning of perforations 100 in the plane of the intermediate material, relative to the direction f corresponding to the direction of the unidirectional layer. The distances between the perforations are purely illustrative, and different variations may be introduced, the latter being mentioned since they are used in the examples. The welds, from one parallel line to another, may be aligned as shown in FIG. 4A or offset, notably by a half-step as shown in FIG. 4B. FIG. 4A shows the perforations produced by an alternative mode in which the perforations extend along two lines perpendicular to each other, each forming an angle of 45° with the strands of the unidirectional layer, such that the perforations are staggered by a half-step, moving parallel and perpendicularly to the strands of the unidirectional layer. FIG. 4B illustrates another mode, in which the perforations extend along two lines perpendicular to each other, one of them being parallel to the strands of the unidirectional layer. The perforations present on the intermediate material, for instance, are larger, measured parallel to the surface of the unidirectional layer, ranging from 1 to 10 mm. For example, in the plane of the intermediate material, the perforations may be circular or more or less elongated in the form of an eye or slot as shown in FIG. 15, in particular. The shape of the perforations is notably a function of the particular perforation device being used. According to such embodiments, it is thus possible to achieve a transversal permeability, notably $10^{-13}$ $m^2$ to $10^{-14}$ $m^2$ for fiber volume ratios of 57 to 63%. Transverse permeability can be defined by the ability of a fluid to pass through a fibrous material. It is measured in $m^2$. The values given above, as well as those mentioned in the examples that follow, are measured with the equipment and measurement technique described in the thesis entitled "Problems in the measurement of transverse permeability of fiber preforms for the fabrication of composite structures", by Romain Nunez, defended at the Ecole Nationale Supérieure des Mines de Saint Etienne, 16 Oct. 2009, which can be consulted for further details. The measurement is notably performed while monitoring the sample thickness during the test using two co-cylindrical chambers to reduce the influence of "race-tracking" (passage of fluid near, or "along the side" of the material whose permeability is being measured). The fluid used is water and the pressure is 1 bar+/−0.01 bar.

Figure 5:
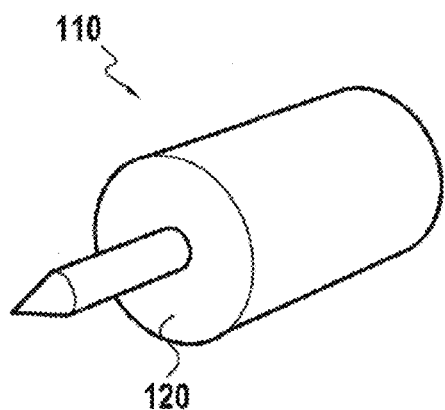
FIG. 5 is a partial perspective of a perforation device.

The perforations can be produced with any suitable perforation device, typically for example, needle, pin or other. Heat is applied around the perforation device, so as to retain the openness after the perforation device is withdrawn. The perforation is then achieved by the penetration of a perforation device and by heating around the perforation device resulting in a softening of the web, followed by cooling. This produces a fusion of the web around the perforation device which after cooling forms a kind of eyelet around the perforation. When the perforation device is removed, the cooling is instantaneous or quasi-instantaneous, thus allowing the perforation to harden. Preferably, the heating device is integrated directly into the perforation device such that the perforation device itself is heated as well. In certain cases, it may be advantageous for the perforation device 110 to have a shoulder 120 as shown in FIG. 5 against which the intermediate material can stop during the perforation. The shoulder itself is heated and heats the webs while exerting pressure on the assembly to be welded, and this occurring over a larger area surrounding the perforation. The duration of the pressure is, for instance, of 0.1 to 2 seconds, preferentially of 0.5 to 1 s. It is possible to perforate manually or preferably automatically by means of perforation devices aligned along the selected perforation lines and spacing. In all cases, the perforations are preferably carried out with very small changes in the thickness of the intermediate material around the perforation. When only a point bonding is planned between the webs and the unidirectional layer, the perforations may be performed simultaneously with the bonding, the adhesion of the webs around the perforations assuring the bonding of the unidirectional layer/web assembly.

Figure 2:
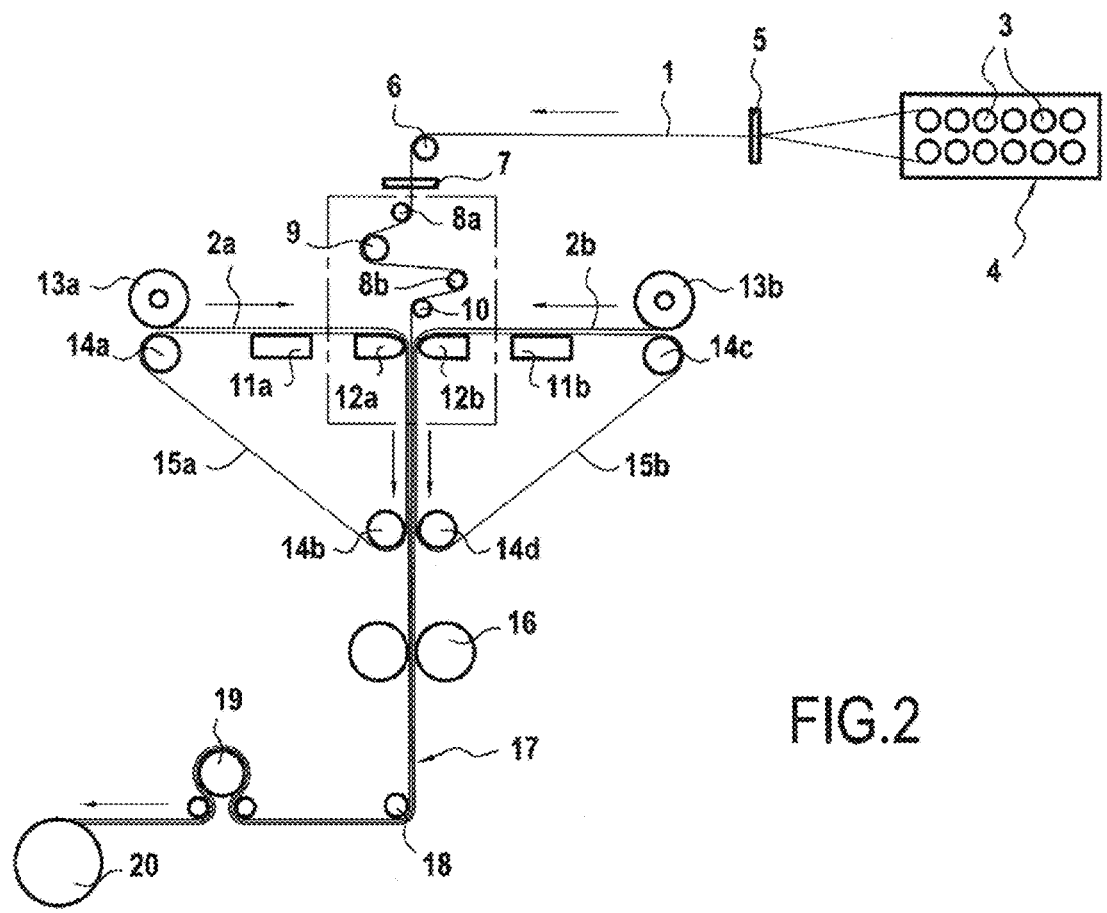
FIG. 2 is a schematic diagram of a machine for fabricating an intermediate material according to the invention.

As an example, a machine such as shown in FIG. 2 could be used for thermocompression bonding and in the absence of perforations. In the case illustrated in FIG. 2, the webs are associated to the carbon fiber unidirectional layer just after the latter is produced with a desired surface density by an attachment or lamination stage under continuous heat and pressure (thermocompression).

The intermediate product according, to the invention, offers good handling due to the presence of thermoplastic webs laminated on each of the faces of the unidirectional layer. This architecture also allows easy cutting, notably without fraying, along non-parallel, notably transversal or oblique directions, with respect to the fibers of the unidirectional layer.

A stacking or draping of intermediate materials according to the invention (also named plies) is used to create composite parts. In the stack thus obtained, the plies are generally placed so as to orient at least two unidirectional layers of plies in different directions. All the unidirectional layers may have different directions or only some of them, while the others may have identical directions. The favored orientations are most often oriented in directions at an angle of 0°, +45° or −45° (also corresponding to +135°), and +90° with the principal axis of the part to be created. The principal axis of the part is generally the largest axis of the part and 0° coincides with this axis. It is, for instance, possible to create stacks that are quasi-isotropic, symmetric, or oriented by selecting the orientation of the plies. Examples of quasi-isotropic stacking include stacking along the angles of 45°/0°/135°/90° or 90°/135°/0°/45°. Examples of symmetric stacking include the angles of 0°/90°/0°, or 45°/135°/45°. Before adding the resin necessary to create the part, it is possible to consolidate the plies among themselves within the stack, notably by an intermediate preforming stage at temperature and under vacuum or by bonding at several points with each added ply, thus creating a preform. In particular, it is possible to consider assembling 2 to 32 plies, notably 16 to 24 plies. The numbers of plies most currently used are 8, 16, 24 and 32 plies, which could for instance be multiples of the 4-ply quasi-isotropic stacks mentioned above.

Advantageously, the stack is secured neither by stitching, nor by knitting, but by a weld produced thanks to the thermoplastic nature of the webs present in the stack. To this end, a heating/cooling operation is performed on the entire surface of the stack, or at least on selected areas at the surface of the stack. The heating causes the fusion or at least the softening of the web. Such a bond, using the thermoplastic nature of the web, is advantageous because it makes it possible to avoid all the disadvantages represented by the presence of stitching or knitting fibers, such as notably, the problems of undulation, microcracking, reduced mechanical properties of the composite parts obtained subsequently. It is possible to achieve a bond by discontinuous welding, as opposed to the continuous welding obtained by thermocompression of the entire surface of the stack. A discontinuous weld has an advantage in terms of energy as well as for the drapeability of the stack when fabricating subsequent composite parts. Spot welds leading to global discontinuous weld can also be considered. As part of the invention, for each unidirectional layer of each subsequent intermediate material, the area of all spot welds is for example, 0.1 to 40%, preferably 0.5 to 15% of the area of the unidirectional layer (this area being equal to the area of one of the faces of the stack). The term "spot" is used as part of the description to designate individual welds belonging to a set of welds and therefore includes different forms of welds. In the plane of the stack, that is, parallel to the different webs and unidirectional layers, the spot welds may notably appear in the form of discontinuous or continuous lines, that is, extending over the full width of the unidirectional layer, of spots of various forms, notably circular or prismatic, of rings . . . .

These spot welds are distributed over the surface of the stack to assure its cohesion and make it possible to assure a bond between the unidirectional layers and the webs through the entire thickness of the stack. Such a bond can notably be transversal. Adapted means of heating may be used, notably in the form of one or several heating rods in the case of bond lines or of heated punches in the case of spot bonds, whose contact point geometry with the stack will be adapted to the form of the desired spot bonds. Such heating means may be brought to a temperature of 190 to 220° C. and pressed on the stack with a pressure of 10 to 50 kPa, for 0.1 to 2 s for example, and preferentially from 0.5 to 1 s. Ultrasonic welding means of can also be used. Of course, these values are purely illustrative and depend notably on the number of plies and the thermoplastic materials of the webs. For example, spot welds can be produced systematically and are preferably located along lines extending in one or two directions, notably at intervals of 4 to 15 mm. FIGS. 4A and 4B are schematics of the positioning of perforations 100 in parallel to the surface of the stack, with respect to the direction f corresponding to the direction 0°. The distances between the perforations are purely illustrative, and different variations may be introduced, the latter being mentioned since they are used in the examples. Parallel to the surface of the stack, the welds from one parallel line to the other may be aligned as shown in FIG. 4A or offset, notably by a half-step, as shown in FIG. 4B. As shown in FIGS. 4A and 4B for the perforations of an intermediate material according to the invention, it is possible for instance, to produce the spot velds by an alternative mode in which the spot welds extend in the plane of the stack along two lines perpendicular to each other, each forming an angle of 45° to 0°, such that the spot welds are staggered by a half-step, in the directions 0° and 90°. Another mode consists for example, in producing spot welds along two lines perpendicular to each other, one of them being parallel to 0°.

Figure 6:
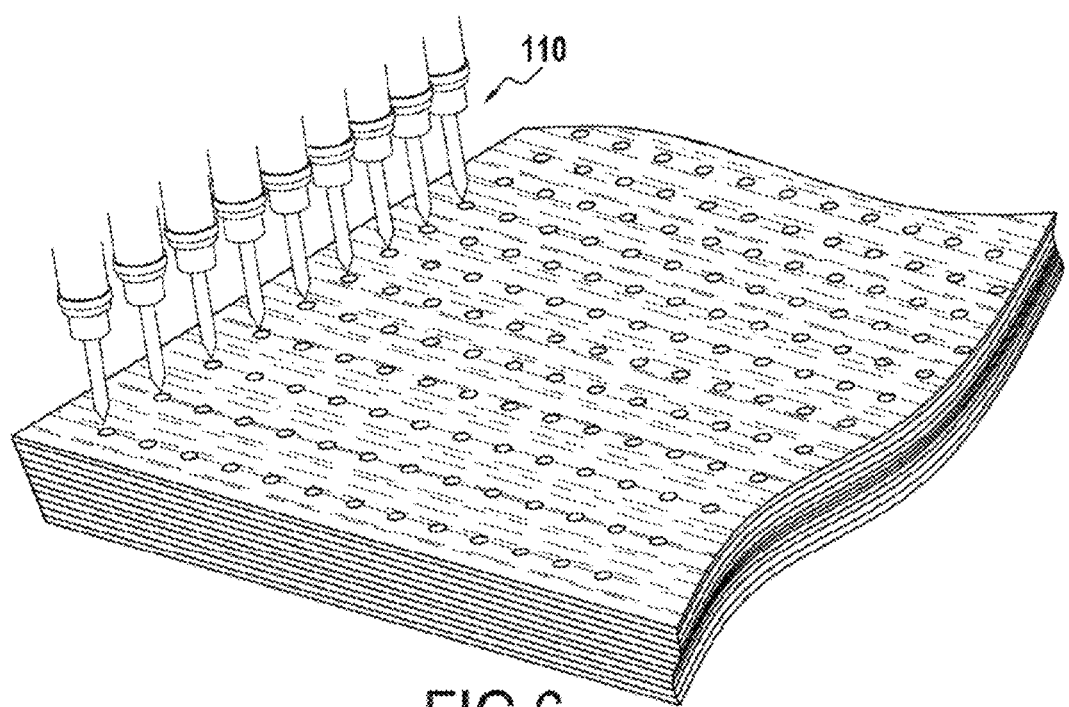
FIG. 6 is a partial view of a device incorporating a variety of means for in-line perforation.

It is possible to create the stack by adding each ply one by one, and assuring the bond after each addition of a ply. It is equally possible to produce the bond in a single step, which presents a definite industrial interest. To this end, although the heating means described above are perfectly suitable, it also possible to use a means of heating which will penetrate within the stack and pass entirely through it so as to produce direct heating on all the webs in the penetration area, including those located in the center of the stack. In this case, concomitantly with the bonding of plies to each other, perforations are produced in the stack to create diffusion channels for the resin, extending into the thickness of the stack, most often transversally to the plies of the stack. In these cases, it may be interesting to achieve an openness factor of 0.05 to 3%, preferably between 0.1 and 0.6%. Such openness factors make it possible to obtain interesting pernreabilities comparable or superior to those obtained with conventional stitched multiaxials. The perforations present in the stack, for example, are larger measured parallel to the surface of the plies, ranging from 1 to 10 mm. According to such embodiment variants, it is thus possible to achieve a transverse permeability for the stack, notably of $10^{-11}$ $m^2$ to $10^{-14}$ $m^2$, preferably $10^{-12}$ $m^2$ to $10^{-13}$ $m^2$ for VFR of 57 to 63% and notably for a VFR of 60%. The perforations can be produced with any suitable perforation device, typically for example. needle, pin or other. Heat is applied around the perforation device, so as to obtain the desired bond between the plies, which also makes it possible to harden the perforation. As in the case of the perforation of a single ply described above, a fusion of the web occurs around the perforating device, which after cooling leads to a kind or eyelet around the perforation. When the perforation device is removed, the cooling is instantaneous or quasi-instantaneous, thus allowing the perforation to harden. Preferably, the heating device is integrated directly into the perforation device such that the perforation device itself is heated as well. It is advantageous for the perforation device to have a shoulder as shown FIG. 5, against which the stack will stop during the perforation, which will help tighten the plies against each other during the bond. The shoulder itself is heated and heats the webs while pressing on the assembly to be welded, and over a larger area surrounding the perforation. Preferably, the pressure exerted is in the range of 10 to 50 kPa and is selected so as to maintain an essentially constant thickness at all points of the stack. It is possible to puncture manually or preferably automatically by means of perforation devices 110 aligned along the selected perforation lines and spacing, as shown for instance in FIG. 6.

For the fabrication of composite parts, a thermosetting resin or matrix is then added, for instance by injection, into the mold containing the plies ("RTM" process, from the English Resin Transfer Moulding), or by infusion (through the thickness of the plies: "LRI" process from the English Liquid Resin Infusion, or "RFI" process from the English Resin Film Infusion). According to a non-preferred variant, it is equally possible before building the stack, to perform a manual coating/impregnation by roller or brush, on each of the plies, applied successively on the form of the mold being used.

The matrix being used is thermosetting. The injected resin will be selected for instance among the following thermosetting polymers: epoxies, unsaturated polyesters, vinylesters, phenolics, polyimides, and bismaleimides.

The composite part is then obtained after a thermal treatment stage. In particular, the composite part is generally obtained by a conventional hardening cycle of the polymers being used, by performing a thermal treatment recommended by the polymer suppliers and known by the person skilled in the art. This hardening stage of the desired part is achieved by polymerization/reticulation according to a defined cycle of temperature and pressure, followed by cooling. The pressure applied during the treatment cycle is low in the case of infusion under vacuum, and higher in the case of injection into an RTM mold.

The unperforated stacks according to the invention, even if they are entirely satisfactory for the production of composite parts by injection into a mold, in the case of an infusion under reduced pressure, their application is limited to the production of thin parts, for instance of less than 10 mm. The presence of perforations makes it possible to increase the permeability of the stack and reach a satisfactory VFR even on thick parts.

The stack binding modes defined above with spot bonds, with or without perforations, can also be implemented with any type of intermediate materials, intended to be associated with a thermosetting resin for the fabrication of composite parts, which consist of a unidirectional carbon fiber associated on each of its faces with a web of thermoplastic fibers and particularly with intermediate materials other than those defined in the claims of this patent application. Indeed, whatever webs and unidirectional layers are used, such stacks are interesting in terms of drapability and permeability in the case of perforated stacks. Preferably of course, the intermediate materials comply in terms of thickness and grammage to those described in the invention, since they achieve high values of VFR in vacuum infusion.

According to a useful characteristic of the invention, the composite parts obtained have a volume fiber ratio of 57 to 63% and preferably of 59 to 61% and notably large thickness, notably larger than 10 mm. These volume fiber ratios are compatible with the use of structures for primary parts, that is, critical parts in aviation that withstand mechanical stress (fuselage, wings . . . ).

The volume fiber ratio (VFR) of a composite part is calculated from a measurement of the thickness of a composite part, knowing the surface density of the unidirectional carbon layer and the properties of the carbon fiber, using the following equation:

$$TVF(\%) = \frac{n_{plis} \times \text{Masse surfacique } UD_{carbone}}{\rho_{fibre\ carbone} \times e_{plaque}} \times 10^{-1} \quad (1)$$

Where $e_{plaque}$ is the thickness of the plate in mm,
$\rho_{fibre\ carbone}$ is the density of the carbon fiber in g/cm$^3$,
the surface density of the carbon $UD_{carbone}$ is in g/m$^2$.

The composite parts obtained also have optimum mechanical properties, notably impact resistance (CAI, Compression After Impact), these mechanical properties showing the sensitivity to holes such as open hole compression (OHC, Open Hole Compression in English), open hole tension (OHT, Open Hole Traction English), bearing (Bearing in English), in-plane shear (IPS, In-Plane Shear in English). In particular, it is possible to obtain composite parts with stress rupture in compression after impact (CAI), measured according to the preliminary European standard prEN 6038 published by ASD-STAN (AeroSpace and Defence Standard, Avenue de Tervuren 270, 1150 Woluwe-Saint-Pierre, Belgium), greater than 200 MPa under an impact of 25 J. Also noted, especially when the resin matrix is of epoxy, was a small decrease of the epoxy Tg after aging, of the same order of magnitude as that obtained for standard preimpregnates, known by the person skilled in the art.

The following examples illustrate the invention, but are not limiting in nature.

1. 1. Materials Used.

The intermediate products tested are unidirectional layers composed of carbon fibers associated with a web on each side. Three types of carbon fibers have been used: 12K intermediary module (IM) fibers sold by Hexcel 12K high resistance (HR) fibers sold by Hexcel, 12K high resistance (HR) fibers sold by Toray; their mechanical and physical properties are shown in Table 1.

Several carbon surface densities of the unidirectional layers were tested. These layers are fabricated on line and their carbon fiber grammage is estimated at 134 g/m$^2$±3% for the Hexcel IM carbon fibers, 194 g/m$^2$±3% for the Hexcel fibers, 134 g/m$^2$±3% for the Hexcel HR fibers, 268 g/m$^2$±3% for the Hexcel HR fibers and 150 g/m$^2$±3% for the Toray HR fibers.

TABLE 1

Characteristic properties of the carbon fibers

| | Hexcel IM | Hexcel HR | Toray HR |
|---|---|---|---|
| Stress rupture (MPa) | 5610 | 4830 | 4900 |
| Tensile modulus (GPa) | 297 | 241 | 240 |
| Elongation (%) | 1.9 | 1.8 | 2 |
| Weight/unit length (g/m) | 0.443 | 0.785 | 0.800 |
| Volume density (g/cm$^3$) | 1.80 | 1.79 | 1.80 |
| Filament diameter (μm) | 5 | 7 | 7 |

Three types of webs were used, named web 1, web 2, (1R8D03 sold by Protechnic, 66, rue des Fabriques, 68702—CERNAY Cedex—France), web 3. These webs are based on a mix of polyamides and copolyamides (web 1 and 2) or on polyamides (web 3). This type of web is also sold by such companies as Spunfab Ltd./Keuchel Associates, Inc. (175 Muffin Lane Cuyahoga Falls, Ohio 44223, USA). Web 1 is composed of continuous filaments. Webs 2 and 3 are composed of short fibers.

The characteristics of the webs used are indicated in Table 2. The melting point of the webs shown in Table 2 is determined by differential sweep calorimetry (DSC) according to the ISO 11357-3 standard. The surface density is measured according to the ISO 3801 standard.

The porosity factor shown in Table 2 is calculated with the following formula:

$$\text{Taux de porosité}_{voile} \ (\%) = 1 - \frac{\text{Masse surfacique du voile}}{\rho_{matière\ du\ voile} \times e_{voile}} \times 100 \quad (2)$$

Where—the surface density of the web is expressed in kg/m$^2$, $\rho_{matière\ du\ voile}$ density of the web material, is expressed in kg/m$^3$, $e_{voile}$ is expressed in m.

TABLE 2

Characteristics of the webs used (the values indicated after ± represent the standard deviation)

| Reference | 1 | 2 | 3 |
|---|---|---|---|
| Melting point of the web (° C.) | 178 | 160 | 178 |
| Surface density (g/m$^2$) | 6.7 ± 0.5 | 2.8 ± 0.1 | 3.7 ± 0.1 |
| Filament diameter (μm)* | 44 ± 12 | 9 ± 2 | 13 ± 3± |

TABLE 2-continued

Characteristics of the webs used (the values indicated after ± represent the standard deviation)

| Reference | 1 | 2 | 3 |
|---|---|---|---|
| Thickness of the web (μm) | 161 ± 18 | 59 ± 12 | 69 ± 12 |
| Porosity factor (%) calculated with formula (2) | 96 | 98 | 97 |

*Measured by image analysis

2. Fabrication of the Tested Intermediate Products

The web is laminated directly on each side of the unidirectional layers based on carbon fibers using a machine (FIG. 2) specifically dedicated for this purpose, just after the formation of the layer with the desired grammage. The carbon strands 1 are unrolled from carbon spools 3 mounted on a creel 4, pass through a comb 5, are brought into the axis of the machine by a guide roller 6 and a comb 7, and a guide bar 8a. The carbon strands are preheated with a heating rod 9 and are then spread by a spreading bar 8b and the heating rod 10 to the desired carbon surface density of the unidirectional layer 17. The web coils 13a and 13b are unwound without tension and transported with the moving belts 15a and 15b attached between the free rotation rollers 14a, 14b, 14c, 14d and the heating rods 12a, 12b. Webs 2a and 2b are preheated in zones 11a and 11b before coming into contact with the carbon strands 1, and pasted on each side of two heating rods 12a and 12b whose air gap is controlled. A coolable calender 16 then applies pressure on the unidirectional layer with a web on each side 17. A return roller 18 redirects the product 17 toward the tensioning system comprising three draw rollers 19 then winding rollers 20 driven by a motor to form a coil composed of the claimed intermediate product 17.

The test conditions for the fabrication of the carbon unidirectional layers combined with a web on each side are shown in Table 3 below.

TABLE 3

Process parameters for the fabrication of unidirectional layers associated with a web on each side

| Example | Fiber Type | Measured surface density of intermediate product (g/m$^2$) | Web type | Line speed (m/min) | T$_{bar}$ (° C.) (9) | T bar (° C.) (10) | T$_{web\ preheat\ web}$ (° C.) (11a & 11b) | T$_{bar}$ (° C.) (12a & 12b) |
|---|---|---|---|---|---|---|---|---|
| Comparative 1 | Hexcel IM | 134 | No web | — | — | — | — | — |
| 2 | Hexcel IM | 149 | Web 1 | 1.3 | 200 | 200 | 120 | 270 |
| Comparative 2b | Hexcel IM | 149 | Web 1 | 1.3 | 200 | 200 | 120 | 170 |
| 3 | Hexcel IM | 141 | Web 2 | 1.6 | 200 | 200 | 120 | 255 |
| 3b | Hexcel IM | 141 | Web 2 | 1.3 | 200 | 200 | 120 | 143 |
| 4 | Hexcel IM | 142 | Web 3 | 1.8 | 200 | 200 | 120 | 265 |
| 4b | Hexcel IM | 142 | Web 3 | 1.3 | 200 | 200 | 120 | 187 |
| Comparative 5 | Hexcel IM | 199 | No web | — | — | — | — | — |
| 6 | Hexcel IM | 213 | Web 1 | 1.6 | 200 | 200 | 120 | 270 |
| 6b | Hexcel IM | 213 | Web 1 | 1.3 | 200 | 200 | 120 | 170 |
| 7 | Hexcel IM | 197 | Web 2 | 1.8 | 200 | 200 | 120 | 255 |

TABLE 3-continued

Process parameters for the fabrication of unidirectional layers associated with a web on each side

| Example | Fiber Type | Measured surface density of intermediate product (g/m$^2$) | Web type | Line speed (m/min) | $T_{bar}$ (° C.) (9) | T bar (° C.) (10) | $T_{web\ preheat\ web}$ (° C.) (11a & 11b) | $T_{bar}$ (° C.) (12a & 12b) |
|---|---|---|---|---|---|---|---|---|
| 7b | Hexcel IM | 197 | Web 2 | 1.3 | 200 | 200 | 120 | 145 |
| 8 | Hexcel IM | 207 | Web 3 | 1.3 | 200 | 200 | 120 | 265 |
| 8b | Hexcel IM | 207 | Web 3 | 1.3 | 200 | 200 | 120 | 193 |
| Comparative 9 | Toray HR | 150 | No web | — | — | — | — | — |
| 10 | Toray HR | 168 | Web 1 | 1.3 | 200 | 200 | 120 | 255 |
| 10b | Toray HR | 168 | Web 1 | 1.3 | 200 | 200 | 120 | 188 |
| 11 | Toray HR | 159 | Web 2 | 1.6 | 200 | 200 | 120 | 250 |
| 11b | Toray HR | 159 | Web 2 | 1.3 | 200 | 200 | 120 | 190 |
| 12 | Toray HR | 162 | Web 3 | 1.3 | 200 | 200 | 120 | 265 |
| 12b | Toray HR | 162 | Web 3 | 1.3 | 200 | 200 | 120 | 210 |
| Comparative 13 | Hexcel HR | 136 | No web | — | — | — | — | — |
| 14 | Hexcel HR | 156 | Web 1 | 1.3 | 200 | 200 | 120 | 270 |
| 14b | Hexcel HR | 157 | Web 1 | 1.3 | 200 | 200 | 120 | 170 |
| 15 | Hexcel HR | 147 | Web 2 | 1.8 | 200 | 200 | 120 | 255 |
| 15b | Hexcel HR | 146 | Web 2 | 1.3 | 200 | 200 | 120 | 145 |
| 16 | Hexcel HR | 147 | Web 3 | 1.5 | 200 | 200 | 120 | 265 |
| 16b | Hexcel HR | 150 | Web 3 | 1.3 | 200 | 200 | 120 | 190 |
| Comparative 17 | Hexcel HR | 268 | No web | — | — | — | — | — |
| 18 | Hexcel HR | 281 | Web 1 | 1.3 | 200 | 200 | 120 | 270 |
| 18b | Hexcel HR | 281 | Web 1 | 1.3 | 200 | 200 | 120 | 170 |
| 19 | Hexcel HR | 274 | Web 2 | 1.6 | 200 | 200 | 120 | 255 |
| 20 | Hexcel HR | 276 | Web 3 | 1.3 | 200 | 200 | 120 | 265 |
| 20b | Hexcel HR | 276 | Web 3 | 1.3 | 200 | 200 | 120 | 190 |

In the case of unidirectional layers without web (comparative example1), the carbon strands are secured with a 280 dtex hot-melt strand distributed every 50 mm perpendicularly to the orientation of the carbon fibers. In the case of the representative examples of the invention, where the unidirectional layers are associated with two webs, the layers are formed directly on the machine, before the lamination with the web.

3. Thickness Determination After Lamination of the Web and the Intermediate Product The thicknesses of the webs after lamination on the unidirectional layers are measured by image analysis. Table 4 shows the average thicknesses and the standard deviations of the webs (for 75 values) obtained by this method for each examined configuration. This same Table 4 indicates the thicknesses of the various intermediate products containing the carbon layers associated with a web on each side. These measurement are derived from measurements of preform thicknesses at atmospheric pressure according to the described methods.

TABLE 4

Thickness of intermediate products (UD layers associated with a web on each side) and of the webs on these layers

| Example | Thickness of web on layer (μm) | Standard deviation of web thickness | Thickness of layer (μm) (UD + web) | Standard deviation of layer thickness |
|---|---|---|---|---|
| Comparative 1 | — | — | 120 | 4 |
| 2 | 20 | 8 | 153 | 3 |
| Comparative 2b | 62 | 15 | 183 | 4 |
| 3 | 12 | 6 | 120 | 4 |
| 3b | 14 | 5 | 123 | 5 |

TABLE 4-continued

Thickness of intermediate products (UD layers associated with a web on each side) and of the webs on these layers

| Example | Thickness of web on layer (μm) | Standard deviation of web thickness | Thickness of layer (μm) (UD + web) | Standard deviation of layer thickness |
|---|---|---|---|---|
| 4 | 13 | 4 | 145 | 4 |
| 4b | 23 | 7 | 157 | 4 |
| Comparative 5 | — | — | 175 | 4 |
| 6 | 21 | 9 | 198 | 2 |
| 6b | 32 | 8 | 224 | 3 |
| 7 | 9 | 3 | 184 | 5 |
| 7b | 11 | 3 | 197 | 3 |
| 8 | 11 | 3 | 185 | 3 |
| 8b | 20 | 7 | 195 | 3 |
| Comparative 9 | — | — | 131 | 2 |
| 10 | 19 | 6 | 169 | 3 |
| 10b | 48 | 16 | 204 | 3 |
| 11 | 13 | 6 | 166 | 4 |
| 11b | 13 | 4 | 161 | 4 |
| 12 | 12 | 3 | 155 | 4 |
| 12b | 22 | 7 | 163 | 4 |
| Comparative 13 | — | — | 123 | 4 |
| 14 | 20 | 7 | 162 | 4 |
| 14b | 46 | 12 | 192 | 3 |
| 15 | 12 | 4 | 155 | 3 |
| 15b | 15 | 6 | 157 | 7 |
| 16 | 15 | 5 | 154 | 3 |
| 16b | 21 | 9 | 164 | 6 |
| Comparative 17 | — | — | 237 | 3 |
| 18 | 19 | 7 | 287 | 5 |
| 18b | 49 | 25 | 301 | 4 |
| 19 | 12 | 6 | 264 | 4 |
| 20 | 16 | 6 | 280 | 7 |
| 20b | 22 | 8 | 286 | 6 |

Figure 7:
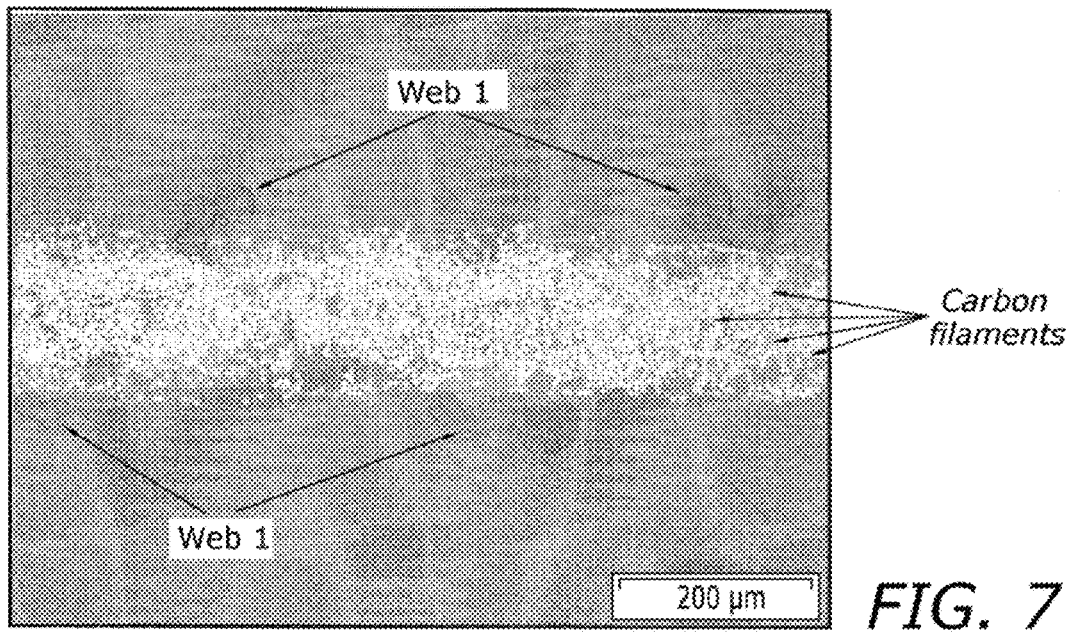
FIGS. 7 to 10 are microscopic cross-sections of intermediate products composed of a unidirectional layer, associated on each of their large faces with a (nonwoven) web.

FIG. 7 is a micrographic cross-section of the intermediate product of example 2b (134 g/m² of Hexcel IM carbon fibers associated with web 1 on each side).

Figure 8:
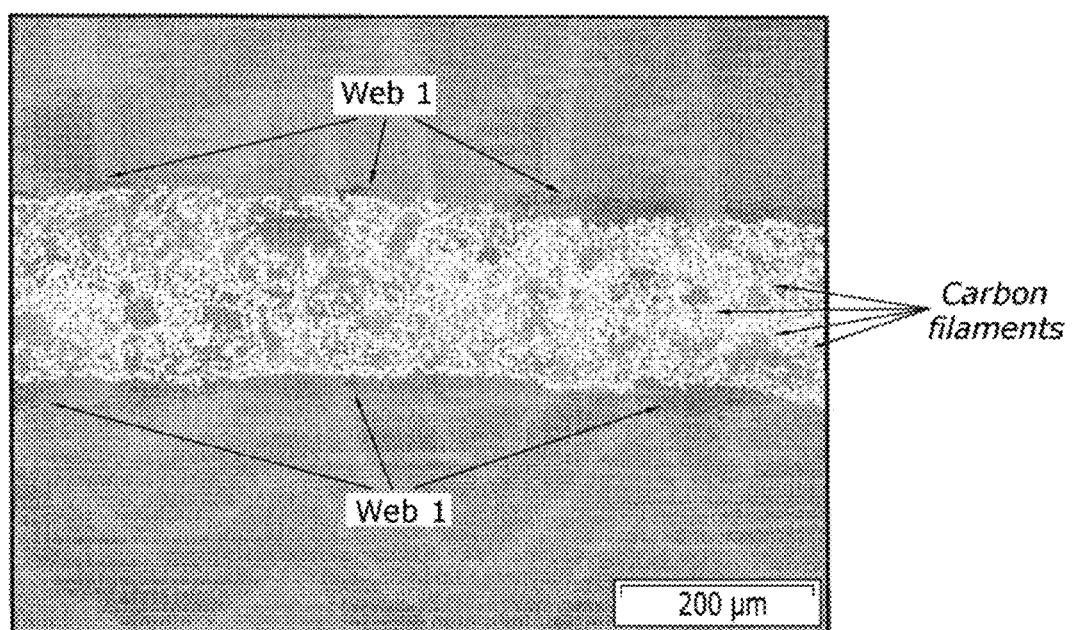

FIG. 8 is a micrographic cross-section of the intermediate product of example 2 (134 g/m² of Hexcel IM carbon fibers associated with web 1 on each side).

Figure 9:
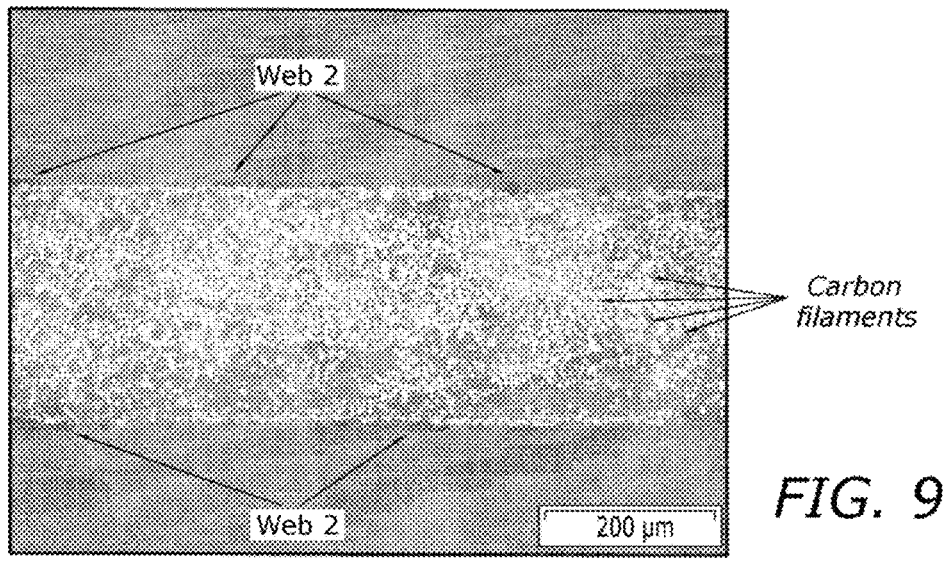

FIG. 9 is a micrographic cross-section of the intermediate product of example 3b (134 g/m² of Hexcel IM carbon fibers associated with web 2 on each side).

Figure 10:
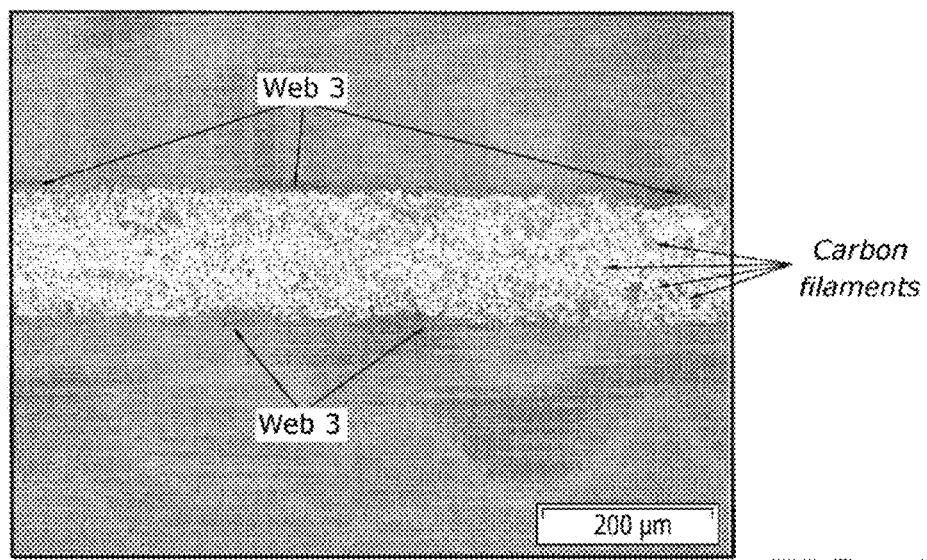

FIG. 10 is a micrographic cross-section of the intermediate product of example 4 (134 g/m² of Hexcel IM carbon fibers associated with web 3 on each side).

4. Fabricating the Plates 4.1 Definition of the Stack Sequence

The plates obtained are quasi-isotropic, that is, they consist of an assembly of elementary plies with the different orientations (0°/45°/−45°/90°). The stack is also symmetrical. The number of plies forming the stack is determined from the following formula, derived from formula (I):

$$n_{plis} = \frac{TVF(\%) \times \rho_{fibre\ carbone} \times e_{plaque}}{\text{Masse surfacique } UDE_{carbone}} \times 10 \qquad (2)$$

where:
the desired thickness of the plate is the closest to 4 mm (defined by the standard prEN 6038), $e_{plaque}$ is expressed in mm,
the intended fiber volume ratio (VFR) for the best mechanical properties, is 60% and $\rho_{fibre\ carbone}$ fiber is expressed in g/cm³,
the surface density of the $UD_{carbone}$ is expressed in g/m².

The stack thus consists of 32 plies for a carbon grammage of 134 and 150 g/m², and is written in brief notation as: $[\pm 45/0/-45/90]_{4s}$. For carbon grammages of 194 and 268 g/m², the number of plies is 24 and 16 plies respectively. The stack is written in brief notation $[+45/0/-45/90]_{3s}$ and $[+45/0/-45/90]_{2s}$. Each ply corresponds to a web/UD/web material.

4.2 Fabrication of the Composite Plate

The different plies are secured to each other by lightly welding at several points after each addition of a new ply, using a soldering iron. The assembly forms a preform. The 340 mm×340 mm preform created by the stacking sequence adapted to the carbon grammage is placed in an injection mold in a press. A frame of known thickness surrounds the preform in order to obtain the desired fiber volume ratio (VFR).

The epoxy resin sold as HexFlow RTM6 by Hexcel is injected at 80° C. at 2 bars through the preform, which is maintained at 120° C., the temperature of the press platens. The pressure applied to each of the two press platens is 5 bars. When the resin appears at the exit of the mold, the exit tubing is closed and the polymerization cycle begins (increase to 180° C. at 3° C./min, then maintained for 2 hours at 180° C. then cooling at 5° C./min). Six 150×100 mm samples per type of configuration (standard prEN 6038) are then cut to perform the compression after impact (CAI) test.

5. Mechanical Tests

The samples (6 per type of configuration) were attached to a device as indicated in standard prEN 6038. The samples were subjected to a single impact with an energy of 25 J using equipment adapted to the preliminary European standard prEN 6038 published by ASD-STAN (AeroSpace and Defence Standard, Avenue de Tervueren 270, 1150 Woluwe-Saint-Pierre, Belgium). The compression tests were performed on a 100 kN mechanical test machine Instron 5582 rebuilt by the Zwick company (Zwick France Sari, Roissy Charles de Gaule, France).

The results of compression rupture stress after impact are SLIOWIA in Tables 5a to 5e.

TABLE 5a

Results of stress rupture in compression after impact (CAI) of 25 J for different types of 134 g/m2 unidirectional IM for different types of webs

| | Comparative example 1 | Example 2 | Comparative example 2b | Example 3 | Example 3b | Example 4 | Example 4b |
|---|---|---|---|---|---|---|---|
| CAI (MPa) | 142 | 260 | 275 | 289 | 279 | 305 | 308 |
| Standard deviation (MPa) | 6 | 15 | 17 | 6 | 18 | 24 | 19 |

TABLE 5b

Results of stress rupture in compression after impact (CAI) of 25 J for different types of 194 g/m² unidirectional IM for different types of webs

|  | Comparative example 5 | Example 6 | Example 6b | Example 7 | Example 7b | Example 8 | Example 8b |
|---|---|---|---|---|---|---|---|
| CAI (MPa) | 126 | 319 | 247 | 285 | 282 | 291 | 294 |
| Standard deviation (MPa) | 14 | 8 | 4 | 5 | 3 | 17 | 5 |

TABLE 5c

Results of stress rupture in compression after impact (CAI) of 25 J for different types of 150 g/m² unidirectional HR Toray for different types of webs

|  | Comp. Ex. 9 | Ex. 10 | Ex. 10b | Ex. 11 | Ex. 11b | Ex. 12 | Ex. 12b |
|---|---|---|---|---|---|---|---|
| CAI (MPa) | 151 | 312 | 337 | 354 | 294 | 320 | 313 |
| Standard deviation (MPa) | 11 | 9 | 12 | 9 | 21 | 11 | 18 |

TABLE 5d

Results of stress rupture in compression after impact (CAI) of 25 J for different types of 134 g/m² unidirectional Hexcel HR for different types of webs

|  | Comparative Example 13 | Example 14 | Example 14b | Example 15 | Example 15b | Example 16 | Example 16b |
|---|---|---|---|---|---|---|---|
| CAI (MPa) | 175 | 299 | 306 | 280 | 280 | 288 | 323 |
| Standard deviation (MPa) | 11 | 17 | 17 | 12 | 12 | 11 | 20 |

TABLE 5e

Results of stress rupture in compression after impact (CAI) of 25 J for the 268 g/m² unidirectional Hexcel HR without web and with web 2

|  | Comparative Example 17 | Example 18 | Example 18b | Example 19 | Example 20 | Example 20b |
|---|---|---|---|---|---|---|
| CAI (MPa) | 135 | 288 | 274 | 253 | 248 | 248 |
| Standard deviation (MPa) | 13 | 16 | 14 | 14 | 13 | 9 |

6. Control of Plate Thickness and Derivation of Volume Fiber Ratios (VFR)

The plates were positioned between two digital comparators IESA Digico 10 to measure their thickness. 24 equidistant measurements on the surface were performed per plate.

Tables 6a to 6e present the results of plates thickness measurements obtained from different fabricated intermediate materials. Given the thicknesses of the plates, the different VFRs can be calculated from formula (2). The comparative example 2b shows the influence of thickness of the webs laminated on the unidirectional layer. The thickness of the web laminated on the layer in the case of example 2b (Table 4) is 62 μm, which is more than the claimed web thickness. The use of this thicker web leads to the fabrication of a part with a volume fiber ratio lower than that required for the use of the part as a primary structure.

TABLE 6a

Thickness measurement of the different plates fabricated from unidirectional layers of carbon fibers 134 g/m² Hexcel IM with different types of web; stack sequence [+45/0/−45/90]$_{4s}$

| | Comparative example 1 | Example 2 | Comparative example 2b | Example 3 | Example 3b | Example 4 | Example 4b |
|---|---|---|---|---|---|---|---|
| Measured thickness (mm) | 3.93 | 3.94 | 4.25 | 3.95 | 3.90 | 3.94 | 3.95 |
| Standard deviation | 0.03 | 0.02 | 0.2 | 0.03 | 0.05 | 0.02 | 0.03 |
| Calculated VFR (%) | 60.7 | 60.5 | 56.0 | 60.3 | 61.2 | 60.5 | 60.3 |

TABLE 6b

Thickness measurement of the different plates fabricated from unidirectional layers of carbon fibers 194 g/m² Hexcel IM with different types of webs; stack sequence [+45/0/−45/90]$_{3s}$

| | Comparative example 5 | Example 6 | Example 6b | Example 7 | Example 7b | Example 8 | Example 8b |
|---|---|---|---|---|---|---|---|
| Measured thickness (mm) | 4.28 | 4.24 | 4.32 | 4.25 | 4.31 | 4.32 | 4.28 |
| Standard deviation | 0.06 | 0.03 | 0.02 | 0.05 | 0.05 | 0.03 | 0.051 |
| Calculated VFR (%) | 60.4 | 61.0 | 59.9 | 60.9 | 60.0 | 59.9 | 60.5 |

TABLE 6c

Thickness measurement of the different plates fabricated from unidirectional layers of carbon fibers 150 g/m² HR Toray with different types of webs; stack sequence [+45/0/−45/90]$_{4s}$

|  | Comp. Ex. 9 | Ex. 10 | Ex. 10b | Ex. 11 | Ex. 11b | Ex. 12 | Ex. 12b |
|---|---|---|---|---|---|---|---|
| Measured thickness (mm) | 4.44 | 4.40 | 4.45 | 4.48 | 4.39 | 4.4 | 4.4 |
| Standard deviation | 0.05 | 0.03 | 0.04 | 0.04 | 0.05 | 0.03 | 0.04 |
| Calculated VFR (%) | 60.8 | 61.3 | 60.6 | 60.2 | 61.4 | 61.3 | 61.3 |

TABLE 6d

Thickness measurement of the different plates fabricated from unidirectional layers of carbon fibers 134 g/m² Hexcel HR with different types of webs; stack sequence [+45/0/−45/90]$_{4s}$

|  | Comp. Ex. 13 | Ex. 14 | Ex. 14b | Ex. 15 | Ex. 15b | Ex. 16 | Ex. 16b |
|---|---|---|---|---|---|---|---|
| Measured thickness (mm) | 3.9 | 4.09 | 4.11 | 3.96 | 3.90 | 3.98 | 4.09 |
| Standard deviation | 0.05 | 0.10 | 0.10 | 0.04 | 0.04 | 0.03 | 0.09 |
| Calculated VFR (%) | 61.4 | 58.6 | 58.3 | 60.4 | 61.4 | 60.3 | 58.6 |

TABLE 6e

Thickness measurement of the different plates fabricated from unidirectional layers of carbon fibers 268 g/m² Hexcel HR with different types of webs; stack sequence [+45/0/−45/90]$_{2s}$

|  | Comp. Ex. 17 | Ex. 18 | Ex. 18b | Ex. 19 | Ex. 20 | Ex. 20b |
|---|---|---|---|---|---|---|
| Measured thickness (mm) | 3.87 | 3.98 | 3.97 | 3.93 | 3.92 | 3.89 |
| Standard deviation | 0.04 | 0.03 | 0.04 | 0.04 | 0.04 | 0.06 |
| Calculated VFR (%) | 61.8 | 60.2 | 60.8 | 61 | 61.2 | 61.6 |

Equation (3) makes it possible to calculate the volume fiber ratio of each composite plate fabricated by injection. It is important to note that independently of the configuration used, the VFR of the plates falls within the range of 60±2% which is an indispensable criterion for obtaining primary structure parts.

7. Examples with Perforations

A robot equipped with a punch head as illustrated in FIG. 5 was used. Two diameters were used for the penetrating portion of the head: 0.8 mm and 1.6 mm. To perform the welding-penetrations, the heads were heated to a temperature of 200° C., and the perforations were made with a pressure of 30 kPa for 0.8 s.

7.1 Spot Welded Quasi-Isotropic Multiaxial (4 Plies)

A stack of 4 plies, oriented 45°, 0°, 135° and 90° was produced on line on a multiaxial fabrication machine. Spot welds spaced by 9, as illustrated in FIG. 4A, were created in the orientations 0° and 90° with respect to the axis of the machine. Alternately, spot welds spaced by 4.5 mm and 4.5 mm, as illustrated in FIG. 4B, were created in the orientations +45° and +135° with respect to the axis of the machine.

Figure 11:
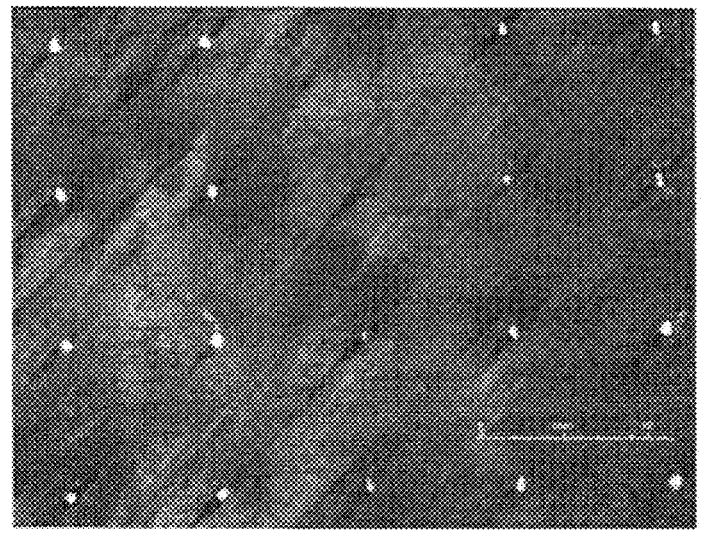
FIGS. 11 through 14 are photographs of the top of stacks welded and perforated according to the invention.

The following stacks were created:

Example 21: 4 plies according to example 8—perforation head ⌀1.6, a photograph of which is shown in FIG. 11

Figure 12:
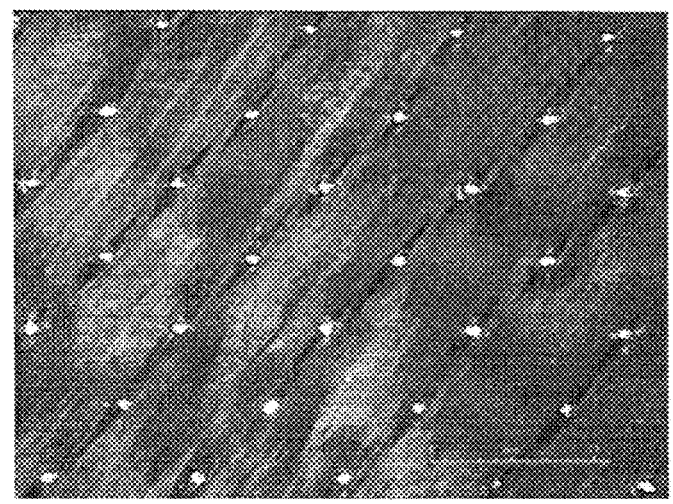

Example 22: 4 plies according to example 8—perforation head ⌀1.6 in alternating fashion, a photograph of which is shown in FIG. 12

Figure 13:
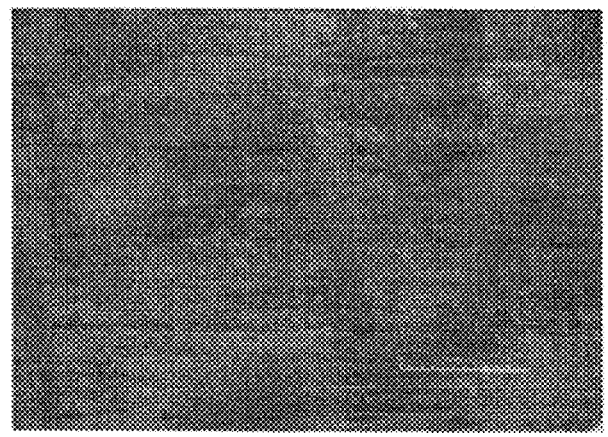

Example 23: 4 plies according to example 8—perforation head ⌀0.8, a photograph of which is shown in FIG. 13

Figure 14:
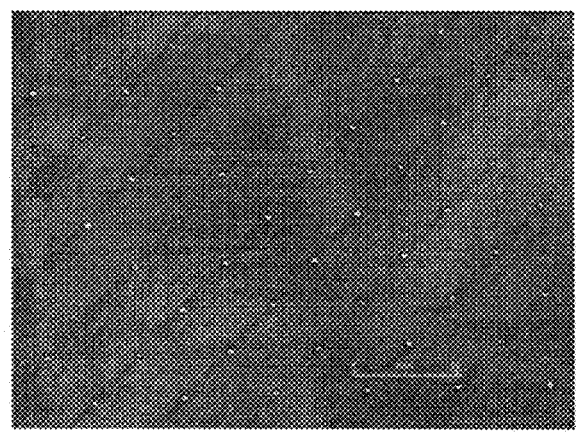

Example 24: 4 plies according to example 8—perforation head ⌀0.8, in alternating fashion, a photograph of which is shown in FIG. 14

Example 25: 1 ply according to example 8—perforation head ⌀1.6, a photograph of which is shown in FIG. 15

Example 26: 4 plies according to example 8 welded (without perforation)—The welding uses a head with a diameter of 8 mm heated to a temperature of 200° C., identical to the perforation heads but without the needle. The welds are placed according to FIG. 4a, but spaced by 50 mm. The welds are performed, with a pressure of 30 kPa.

And as a comparison for the transverse permeability:

Twill fabric 2./2—ref Hexed 48302

Quasi-isotropic multiaxial 4×194 g/m² HR stitched with thread 76 dtex–5 mm×5 mm–chain stitch.

7. 2 Transverse Permeability Measurements

Figure 16:
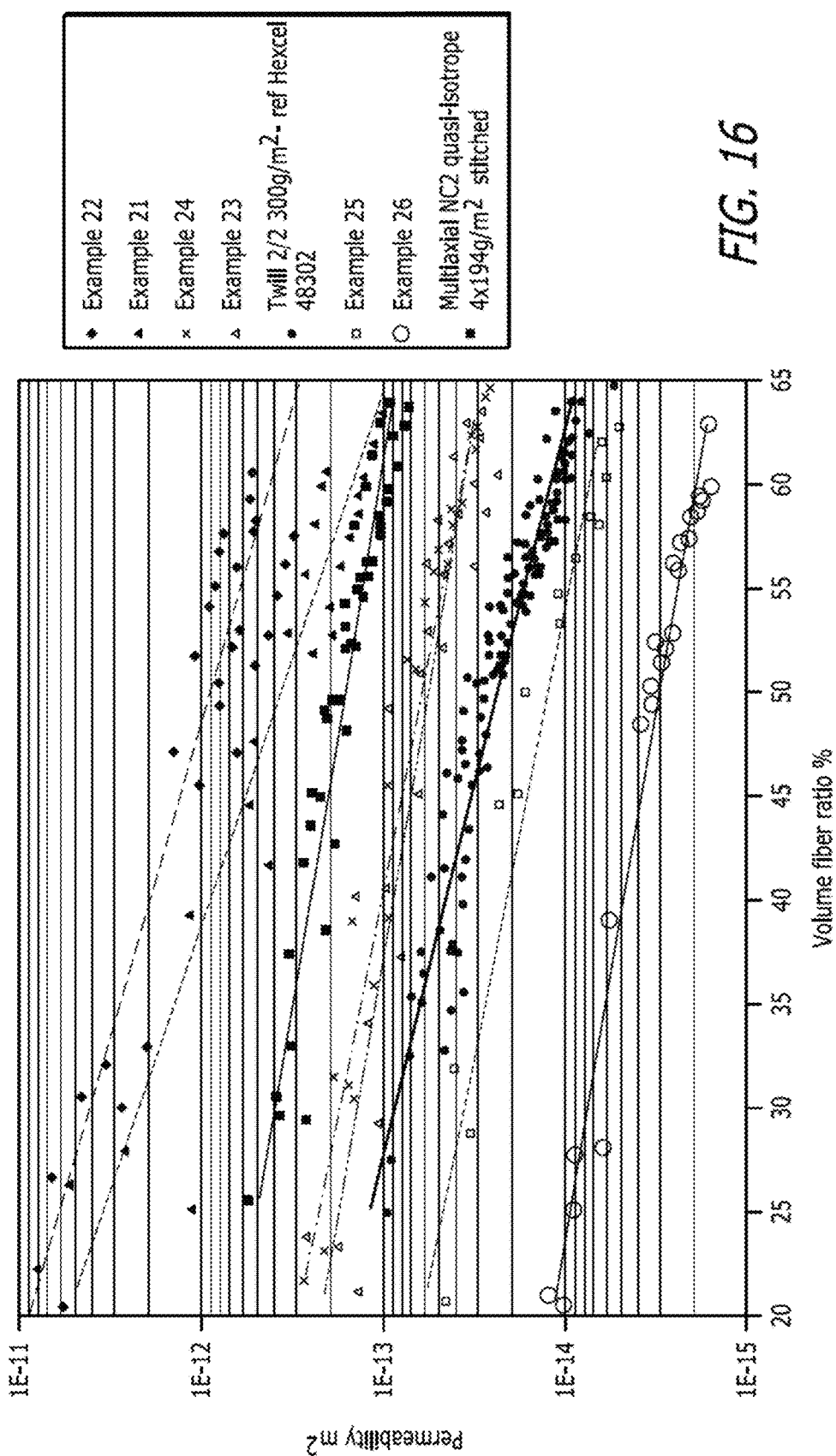
FIG. 16 shows the permeability values as a function of the volume fiber ratio obtained in several configurations.

The machine and measurement method are described in the thesis entitled "Problems in the measurement of transverse permeability of fibrous preforms for the fabrication of composite structures," by Romain Nunez, defended at the Ecole Nationale Supérieure des Mines de Saint Etienne, 16 Oct. 2009, The FVR variation is obtained by successive variations of the sample thickness. Four tests were conducted for each type of material. The results are presented in FIG. 16 and show that the lowest curve corresponds to the permeability of four intermediate materials in accordance with the invention, which have been welded in the absence of perforation. It clearly appears that the resulting stack is very permeable, and that it will therefore be difficult to impregnate under vacuum to a great thickness. The perforations can incontestably improve the permeability to approach or exceed that obtained with a stitched multiaxial. The creation of perforations on an intermediate material can alone also significantly improve transverse permeability, but to a lesser extent compared with a four-ply complete and perforated stack.

|  | Volume fiber ratio in % | |
|---|---|---|
| Permeability values in m² | 55 | 60 |
| Example 22 | 5.5E−13 | 3.7E−13 |
| Example 21 | 2.2E−13 | 1.4E−13 |
| Example 24 | 4.6E−14 | 3.5E−14 |
| Example 23 | 4.8E−14 | 3.8E−14 |
| Twill fabric 2/2 - 4 plies ref. Hexcel 48302 | 1.8E−14 | 1.3E−14 |
| Example 25 | 9.7E−15 | 7.4E−15 |
| Example 26 | 2.4E−15 | 1.9E−15 |

7.3 Openness Factor Measurements

The openness factors were measured using the following method.

The device consists of a SONY camera (model SSC-DC5: 8AP), equipped with a 10× objective, and a Waldmann light table, model W LP3 NR, 101381 230V 50 HZ 2×15 W. The sample to be measured is placed on the light table, the camera is mounted on a frame, positioned at 29 cm from the sample, and then focused.

The width measurement is determined as a function of the fibrous material to be analyzed, using the (zoom) ring and a ruler: 10 cm for open fibrous materials (OF>2%), 1.17 cm for less open fibrous materials (OF<2%).

Using the diaphragm and a control image, the brightness is adjusted to obtain an OF value corresponding to the one of the control image.

The Videomet contrast measurement program, from the company Scion Image (Scion Corporation, USA) is used. The image obtained is processed as follows: using a tool, a maximum area is defined, corresponding to the chosen calibration, for example 10 cm-70 perforations, and comprising an integer number of patterns. An elemental area is then selected, in the textile meaning of the term, that is, an area that describes the geometry of the fibrous material as a repeating pattern.

With the light from the light table passing through the openings of the fibrous material, the OF percentage is defined by one hundred from which is subtracted the black area divided by the elemental area, that is, 100−(black area/elemental area).

If should be noted that the brightness control is important because diffusion phenomena can alter the apparent size of the perforations and therefore the OF. An intermediate brightness will be chosen, such that no excessive saturation or diffusion phenomenon will be The results obtained are shown in TABLE 7 below:

TABLE 7

|  | Ex. 21 | Ex. 22 | Ex. 23 | Ex. 24 | Ex. 25 |
|---|---|---|---|---|---|
| Average % OF | 0.14 | 0.54 | 0.08 | 0.13 | 0.96 |
| Standard deviation | 0.002 | 0.15 | 0.03 | 0.05 | 0.06 |

It should be noted that the openness factor of a perforated ply is rather high (about 1%) and is higher than those obtained with perforated stacks, while the permeability of the perforated ply alone is lower than those of the stacks. It thus seems that a single perforation performed during the assembly of different plies to form a stack is more efficient in terms of permeability than the stacking of intermediate materials perforated separately. It is indeed conceivable that the fluid resin penetrates more easily through channels already created through several thicknesses. Whatever the case may be, the increased permeability of each ply ($2 \cdot 10^{-15}$ m$^2$ to $7 \cdot 10^{-15}$ m$^2$ for a VFR of 60%) related to its increased openness factor (from 0 to 1%) is very important and will make it possible to increase the possible thicknesses of the laminates. created with intermediate materials according to the invention.

7.4 Mechanical Values

Multiaxial stacks welded according to the invention were compared to the same stitched multiaxials.

The reference stitched multiaxials consist of plies corresponding to example 12. The stitching thread is a 76 dtex polyamide thread, with a 5 mm×5 mm chain stitch.

The welded multiaxials were made with the same plies as for example 12, but welded in a square pattern according to FIG. 4A, but at 50 mm×50 mm, with a spot weld diameter of 8 mm, and therefore without stitching. The stack used for the tests is $[(90/+45/0)/(0/-45/90)/(90/+45/0)/(90/-45/0)^5$.

The standards used are listed in Table 8 below.

The following specific conditions were used. Rectangular samples of 190×25 mm$^2$ were used in traction, and a cord modulus between 1000 and 6000 µm/m was calculated. Samples of 150×25 mm$^2$ with a perforation diameter of 5 mm were used for open hole traction. Samples of 150×25 mm$^2$ with a perforation diameter of 5 mm and a 100° countersink with a depth of 2.1 mm carrying a 5RH8035M ST 39584 nut (035 daN·m clamping torque) and a 22258 TX 050 005 ST 38260 screw were used. Samples of 115×25 mm$^2$ with 5 mm perforations were used for open hole compression. The head and the foot of the sample were loaded. In filled-hole compression, samples of 115×25 mm$^2$ with a perforation diameter of 5 mm and a 100° countersink with a depth of 2.1 mm carrying a 5RH8035M ST 39584 nut (0.35 daN·m clamping torque) and a 22258 TX 050 005 ST 38260 screw were used. The head and the foot of the samples were loaded.

The tests were conducted under laboratory conditions of standardized humidity and temperature ("dry", "room temperature" tests).

TABLE 8

| Test Type | Batch | Average | Standard deviation |
|---|---|---|---|
| Tension stress (MPa) | Stitched | 816 | 29 |
| Standard: EN 6035 type 2 | Welded | 903 | 4 |
| Tensile modulus (GPa) | Stitched | 47.87 | 0.40 |
| Standard: EN 6035 type 2 with a cord modulus of 1000-6000 µm/m | Welded | 48.52 | 0.57 |
| Open hole tension stress [MPa] | Stitched | 489 | 71 |
| Standard: EN 6035 type 1 | Welded | 462 | 21 |
| Filled hole tension stress [MPa] | Stitched | 397 | 15 |
| Standard: EN 6035 type 1 + countersink 100° and screw | Welded | 379 | 74 |
| Open hole tension stress [MPa] | Stitched | 247 | 7 |
| Standard: EN 6036 type 1 | Welded | 244 | 4 |
| Filled hole tension stress [MPa] | Stitched | 302 | 14 |
| Standard: EN 6036 type 3 | Welded | 291 | 16 |
| Tensile modulus (GPa) | Stitched | 479 | 4 |
| Enlargement: x10 | Welded | 485 | 6 |

Figure 17:
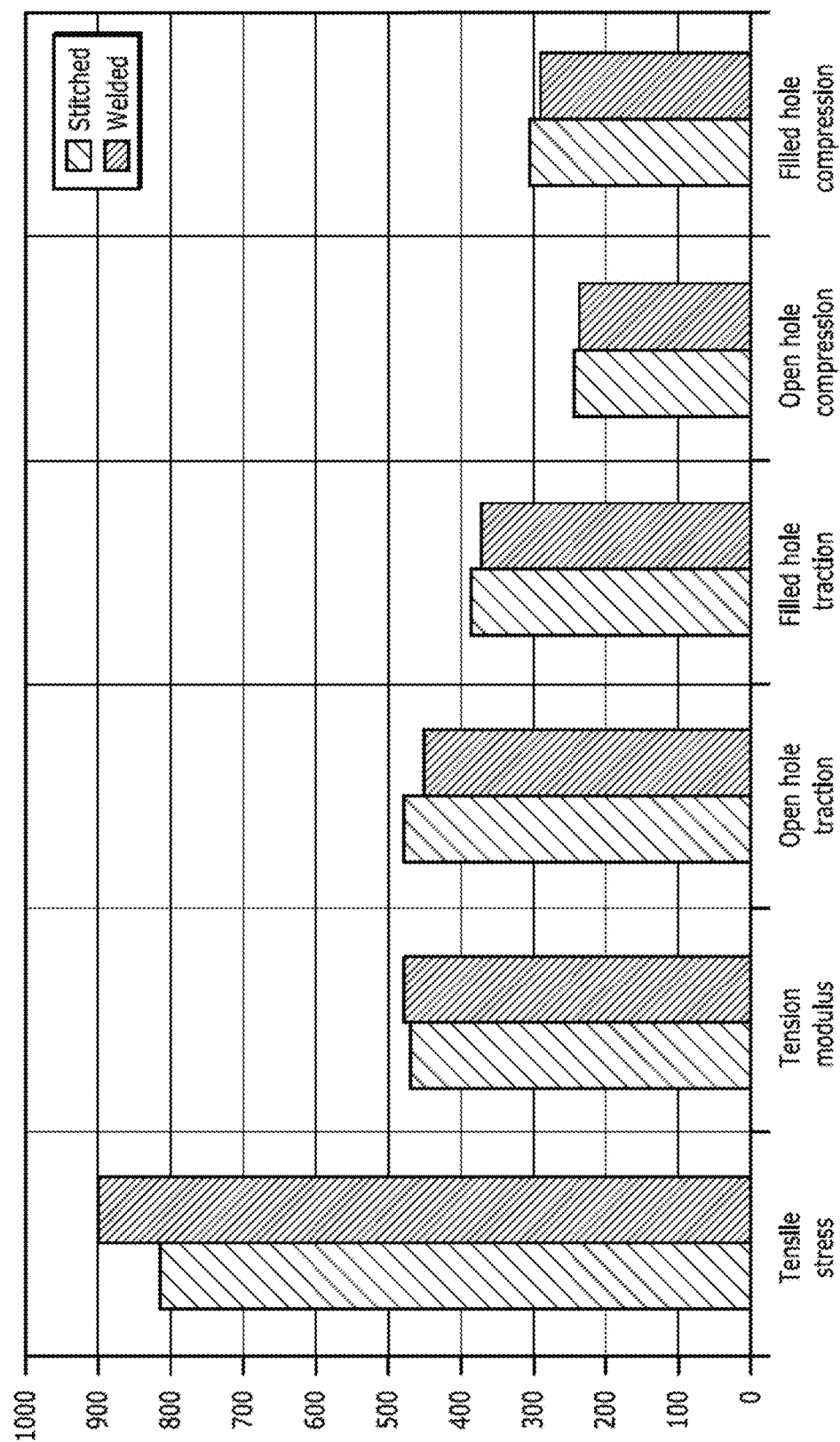
FIG. 17 shows the results of mechanical tests.

FIG. 17 shows all these results.

What is claimed is:

1. A fibrous preform that is combinable with a thermosetting resin to form a composite part that has a volume fiber ratio of between 57 and 63 percent, said fibrous preform comprising:
 a stack of layers of an intermediate material, said layers of intermediate material each comprising:
  a unidirectional layer of carbon fibers with a surface density of 100 to 280 g/m$^2$ and a thickness of between 90 and 270 microns, said unidirectional layer of carbon fibers having a first side and a second side;
  a first web which comprises nonwoven thermoplastic fibers that have diameters of from 0.5 microns to 16 microns, said first web having an interior side located next to the first side of said unidirectional layer of carbon fibers and an exterior side which forms the first surface of said intermediate material, wherein said first, web is thermally bonded to the first side of said unidirectional layer of carbon fibers and wherein the distance between the interior side and exterior side of said first web is from 3 to 15 microns; and
  a second web which comprises nonwoven thermoplastic fibers that have diameters of from 0.5 microns to 16 microns, said second web having an interior side located next to the second side of said unidirectional layer of carbon fibers and an exterior side which forms the second surface of said intermediate material, wherein said second web is thermally bonded to the second side of said unidirectional layer of carbon fibers and wherein the distance between the interior side and exterior side of said second web is from 3 to 15 microns, said layers of intermediate material being held together by spot welds located at a sufficient number of locations to provide said fibrous preform that is combinable with a thermosetting resin to form a composite part that has a volume fiber ratio of between 57 and 63 percent.

2. A fibrous preform according to claim 1 wherein said fibrous preform is at least 10 millimeters thick and wherein said fibrous preform is perforated with holes that extend vertically through said stack.

3. A fibrous preform according to claim 1 wherein the first web and second web are essentially identical.

4. A fibrous preform according to claim 1 wherein the first and second webs have a surface density of from 0.5 /m² to 3.8 g/m².

5. A fibrous preform according to claim 2 wherein the number of holes that extend vertically through said stack is sufficient to provide layers of intermediate material having an openness factor of from 0.1 to 5 percent.

6. A fibrous preform according to claim 1 wherein said spot welds are spaced from each other in discontinuous lines at intervals of from 4 to 15 mm.

7. A fibrous preform according to claim 2 wherein said spot welds are in the form of an eyelet surrounding said holes that extend vertically through said stack.

8. A composite part having a volume fiber ratio of between 57 and 63 percent, said composite part comprising a fibrous preform according to claim 1 and a thermosetting resin.

9. A composite part having a volume fiber ratio of between 57 and 63 percent, said composite part comprising a fibrous preform according to claim 2 and a thermosetting resin.

10. A method for making a fibrous preform that is combinable with a thermosetting resin to form a composite part that has a volume fiber ratio of between 57 and 63 percent, said method comprising the steps of:

forming a stack of layers of an intermediate material, said layers of intermediate material each comprising:

a unidirectional layer of carbon fibers with a surface density of 100 to 280 g/m² and a thickness of between 90 and 270 microns, said unidirectional layer of carbon fibers having a first side and a second side;

a first web which comprises nonwoven thermoplastic fibers that have diameters of from 0.5 microns to 16 microns, said first web having an interior side located next to the first side of said unidirectional layer of carbon fibers and an exterior side which forms the first surface of said intermediate material, wherein said first web is thermally bonded to the first side of said unidirectional layer of carbon fibers and wherein the distance between the interior side and exterior side of said first web is from 3 to 15 microns; and a second web which comprises nonwoven thermoplastic fibers that have diameters of from 0.5 microns to 16 microns, said second web having an interior side located next to the second side of said unidirectional layer of carbon fibers and an exterior side which forms the second surface of said intermediate material, wherein said second web is thermally bonded to the second side of said unidirectional layer of carbon fibers and wherein the distance between the interior side and exterior side of said second web is from 3 to 15 microns; and holding said layers of intermediate material together by spot welds located at a sufficient number of locations to provide said fibrous preform that is combinable with a thermosetting resin to form a composite part that has a volume fiber ratio of between 57 and 63 percent.

11. A method for making a fibrous preform according to claim 10 wherein said fibrous preform is at least 10 millimeters thick and wherein said method includes the step of perforating said fibrous preform with holes that extend vertically through said stack.

12. A method for making a fibrous preform according to claim 1 wherein the first web and second web are essentially identical.

13. A method for making a fibrous preform according to claim 1 wherein the first and second webs have a surface density of from 0.5 g/m² to 3.8 g/m².

14. A method for making, a fibrous preform according to claim 2 wherein the number of holes that extend vertically through said stack is sufficient to provide layers of intermediate material having an openness factor of from 0.1 to 5 percent.

15. A method for making a fibrous preform according to claim 1 wherein said spot welds are spaced from each other in discontinuous lines at intervals of from 4 to 15 mm.

16. A method for making a fibrous preform according to claim 2 wherein said spot welds are in the form of an eyelet surrounding said holes that extend vertically through said stack.

17. A method for making a fibrous preform according to claim 1 which includes the additional step of combining said preform with a thermosetting resin to form a composite part having a volume fiber ratio of between 57 and 63 percent.

18. A method for making a fibrous preform according to claim 2 which includes the additional step of combining said preform with a thermosetting resin to form a composite part having a volume fiber ratio of between 57 and 63 percent.

19. A composite part made according to the method of claim 17.

20. A composite part made according to the method of claim 18.

* * * * *